(12) United States Patent
Akenine-Moller et al.

US010719447B2

(10) Patent No.: US 10,719,447 B2
(45) Date of Patent: Jul. 21, 2020

(54) CACHE AND COMPRESSION INTEROPERABILITY IN A GRAPHICS PROCESSOR PIPELINE

(71) Applicant: Intel Corporation, Santa Clara, CA (US)

(72) Inventors: Tomas G. Akenine-Moller, Lund (SE); Prasoonkumar Surti, Folsom, CA (US); Altug Koker, El Dorado Hills, CA (US); David Puffer, Tempe, AZ (US); Jim K. Nilsson, Lund (SE)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/275,912

(22) Filed: Sep. 26, 2016

(65) Prior Publication Data
US 2018/0089091 A1    Mar. 29, 2018

(51) Int. Cl.
*G06F 12/00* (2006.01)
*G06F 13/00* (2006.01)
(Continued)

(52) U.S. Cl.
CPC ...... *G06F 12/0875* (2013.01); *G06F 12/0207* (2013.01); *G06T 1/20* (2013.01);
(Continued)

(58) Field of Classification Search
CPC ............................... G06F 17/22; G06F 3/0655
(Continued)

(56) References Cited

U.S. PATENT DOCUMENTS

2002/0097172 A1* 7/2002 Fallon .................. G06T 9/00
                                                        341/51
2005/0080986 A1* 4/2005 Park .................... G06F 12/0246
                                                        711/103
(Continued)

FOREIGN PATENT DOCUMENTS

CN    109643443 A    4/2019
DE    112017004246 T5    5/2019

OTHER PUBLICATIONS

PCT Application No. PCT/US2017/043950, Notification of Transmittal of the International Search Report and the Written Opinion, dated Dec. 1, 2017, 17 pgs.

*Primary Examiner* — Edward J Dudek, Jr.
*Assistant Examiner* — Sidney Li
(74) *Attorney, Agent, or Firm* — Jaffery Watson Mendonsa & Hamilton LLP

(57) ABSTRACT

Described herein are several embodiments which provide for enhanced data caching in combination with adaptive and dynamic compression to increase the storage efficiency and reduce the transmission bandwidth of data during input and output from a GPU. The techniques described herein can reduce the need to access off-chip memory, resulting in improved performance and reduced power for GPU operations. One embodiment provides for a graphics processing apparatus comprising a shader engine; one or more cache memories; cache control logic to control at least one of the one or more cache memories; and a codec unit coupled with the one or more cache memories, the codec unit configurable to perform lossless compression of read-only surface data upon storage to or eviction from the one or more cache memories.

17 Claims, 25 Drawing Sheets

(51) Int. Cl.
*G06F 13/28* (2006.01)
*G06F 12/0875* (2016.01)
*G06F 12/02* (2006.01)
*G06T 1/20* (2006.01)
*G06T 1/60* (2006.01)
*G06T 15/00* (2011.01)
*G06F 3/06* (2006.01)
*G06F 40/12* (2020.01)
*G06F 12/084* (2016.01)
*G06F 12/0842* (2016.01)

(52) U.S. Cl.
CPC ............ *G06T 1/60* (2013.01); *G06T 15/005* (2013.01); *G06F 3/0655* (2013.01); *G06F 12/084* (2013.01); *G06F 12/0842* (2013.01); *G06F 40/12* (2020.01); *G06F 2212/1024* (2013.01); *G06F 2212/302* (2013.01); *G06F 2212/401* (2013.01); *G06F 2212/455* (2013.01)

(58) Field of Classification Search
USPC ......................................................... 711/118
See application file for complete search history.

(56) References Cited

U.S. PATENT DOCUMENTS

| | | | |
|---|---|---|---|
| 2005/0219253 A1* | 10/2005 | Piazza | G06T 15/005 345/557 |
| 2005/0268044 A1 | 12/2005 | Arcas | |
| 2006/0259431 A1* | 11/2006 | Poisner | G06F 21/126 705/51 |
| 2006/0285756 A1* | 12/2006 | Sugita | H04N 1/41 382/232 |
| 2012/0212489 A1* | 8/2012 | Fisk | G06T 9/00 345/422 |
| 2013/0251256 A1 | 9/2013 | Deng et al. | |
| 2014/0056533 A1 | 2/2014 | Charikar et al. | |
| 2015/0030222 A1* | 1/2015 | Pang | G06T 9/00 382/131 |
| 2015/0379684 A1 | 12/2015 | Ramani et al. | |
| 2016/0133029 A1 | 5/2016 | Akenine-Moller | |
| 2018/0075574 A1* | 3/2018 | Brennan | G06T 1/60 |

* cited by examiner

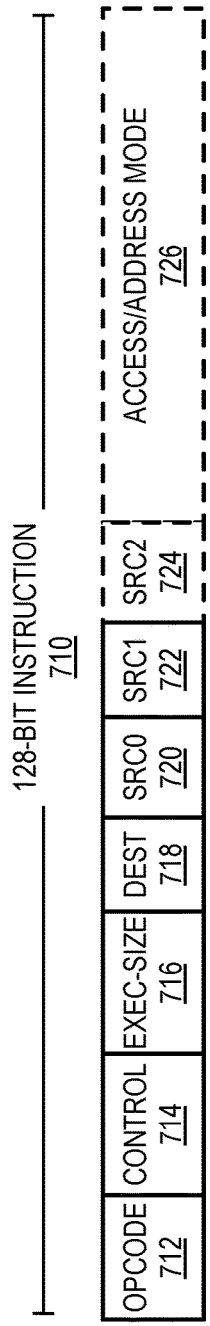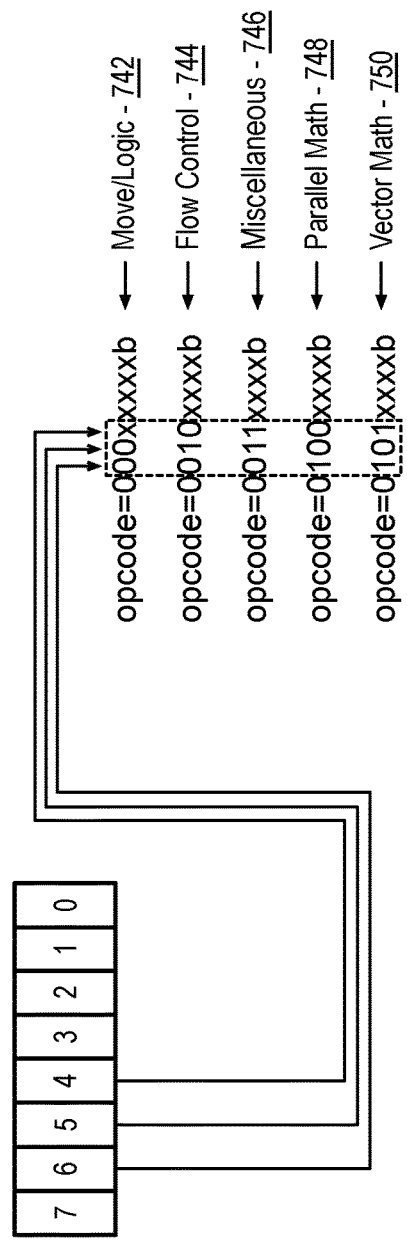
FIG. 7

US 10,719,447 B2

CACHE AND COMPRESSION INTEROPERABILITY IN A GRAPHICS PROCESSOR PIPELINE

TECHNICAL FIELD

Embodiments generally relate to logic to perform graphics processing operations. More particularly, embodiments relate to cache and compression logic for a graphics processor.

BACKGROUND

In a graphics processing unit (GPU), transactions over memory buses may cost several orders of magnitude more than computation in terms of energy and latency. Therefore, graphics processing architectures include numerous tradeoffs between performing additional computations to reduce the amount of data transferred over a memory bus, which is the motivation behind buffer compression algorithms, commonly found in graphics processing units (GPUs).

Compression algorithms can be used to compress data before transmission over a bus and can also be used to compress data that will be stored within one or more cache memories. While performing compression algorithms may require additional logic or additional computational cycles, reductions in power consumption and latency may result due to the reduce memory bus bandwidth required to transmit data and the increased storage efficiency of cache memories. Thus, implementing compression within a GPU pipeline may reduce power and increase performance, even if additional logic operations are performed in the process.

BRIEF DESCRIPTION OF THE DRAWINGS

The various advantages of the embodiments will become apparent to one skilled in the art by reading the following specification and appended claims, and by referencing the following drawings, in which:

FIG. 7 illustrates a graphics processor execution unit instruction format according to an embodiment;

DESCRIPTION OF EMBODIMENTS

Described herein are several embodiments which provide for enhanced data caching in combination with adaptive and dynamic compression to increase the storage efficiency and reduce the transmission bandwidth of data during input and output from a GPU. The techniques described herein can reduce the need to access off-chip memory, resulting in improved performance and reduced power for GPU operations.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-14 provide an overview of exemplary data processing system and graphics processor logic that incorporates or relates to the various embodiments. FIGS. 15-23 provide specific details of the various embodiments. Some aspects of the following embodiments are described with reference to a graphics processor, while other aspects are described with respect to a general-purpose processor, such as a central processing unit (CPU). Similar techniques and teachings can be applied to other types of circuits or semiconductor devices, including but not limited to a many integrated core processor, a GPU cluster, or one or more instances of a field programmable gate array (FPGA). In general, the teachings are applicable to any processor or machine that manipulates or processes image (e.g., sample, pixel), vertex data, or geometry data.

System Overview

Figure 1:
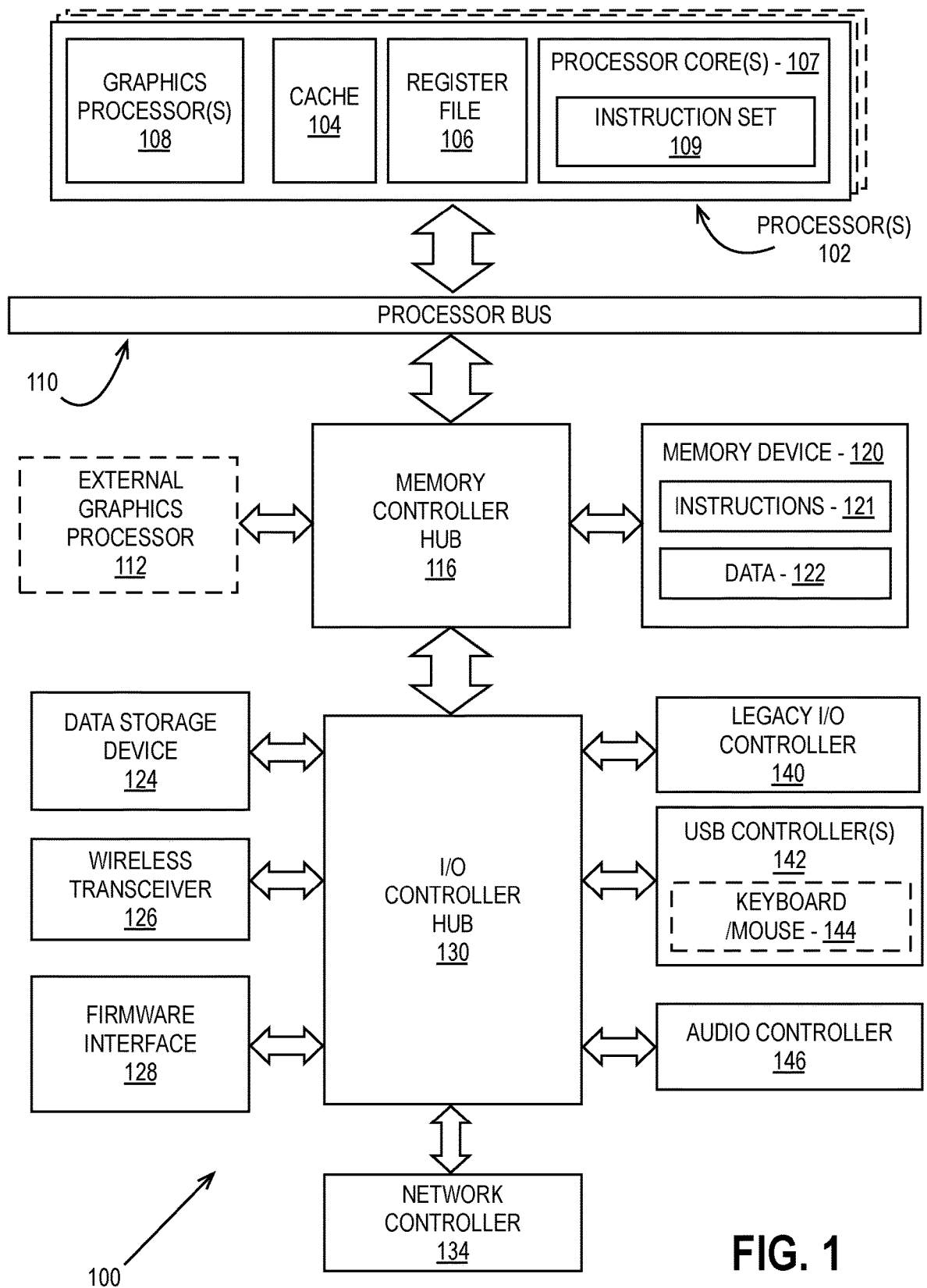
FIG. 1 is a block diagram of an embodiment of a computer system with a processor having one or more processor cores and graphics processors.

FIG. 1 is a block diagram of a processing system 100, according to an embodiment. In various embodiments, the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while an I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
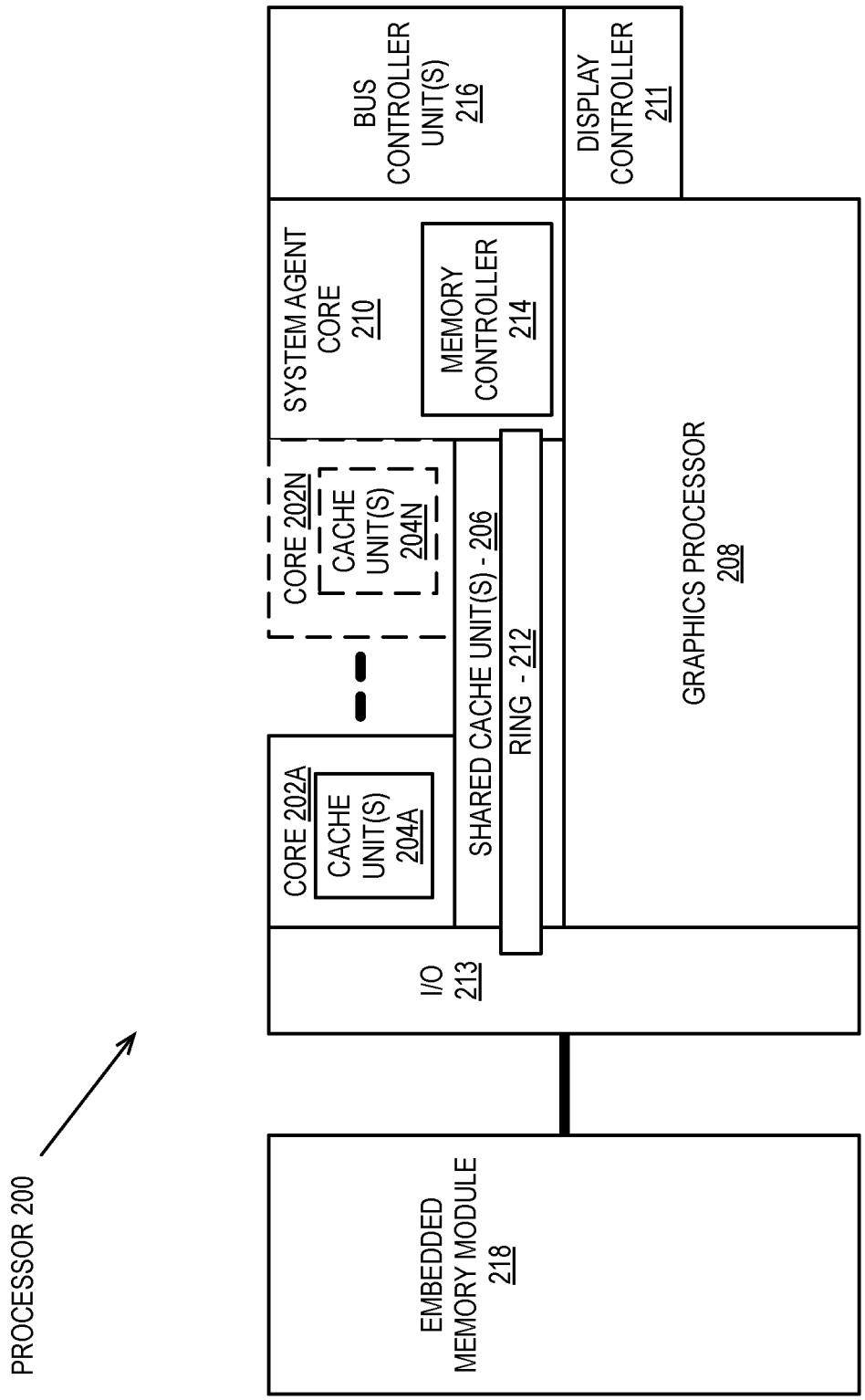
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
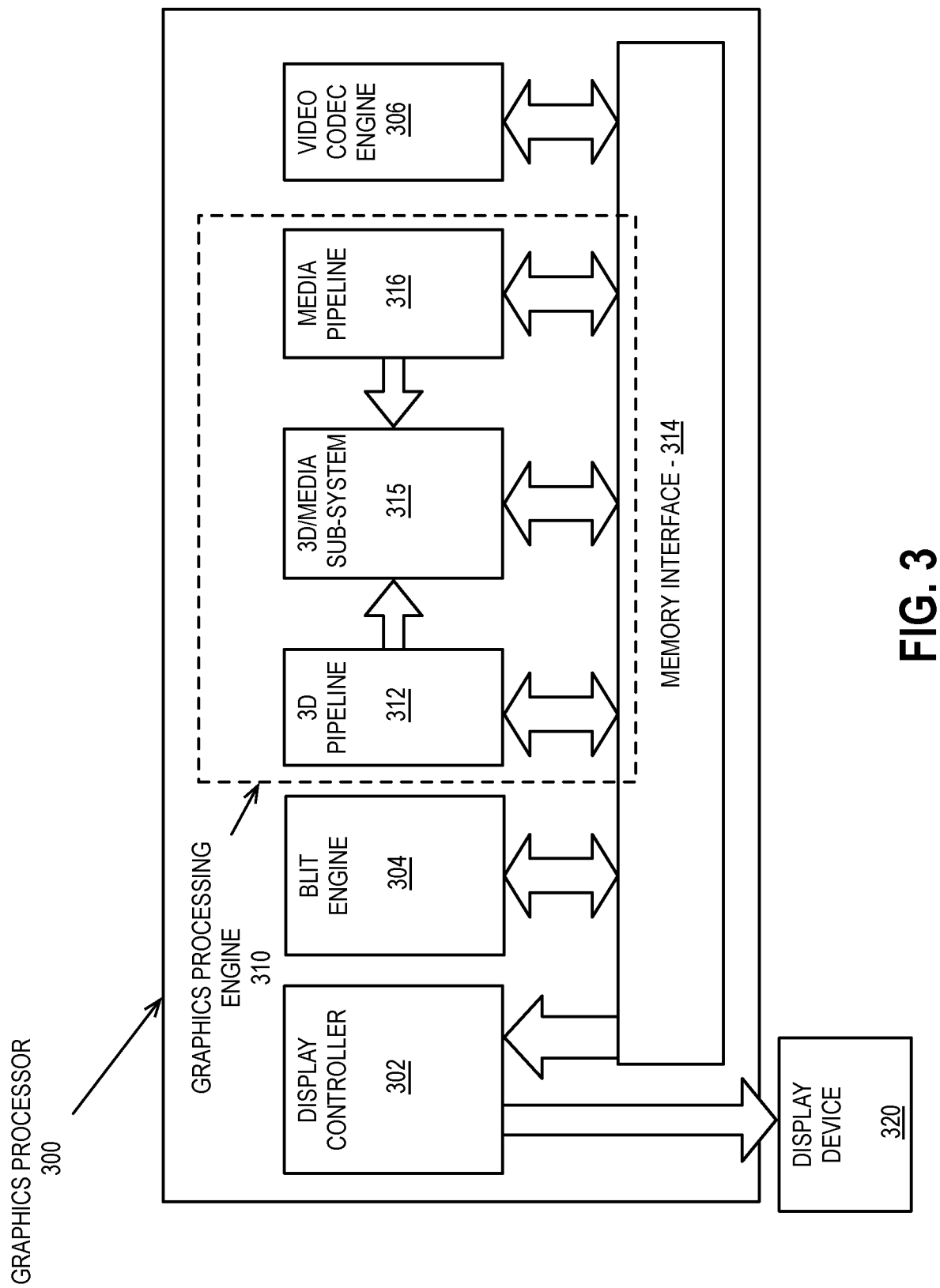
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
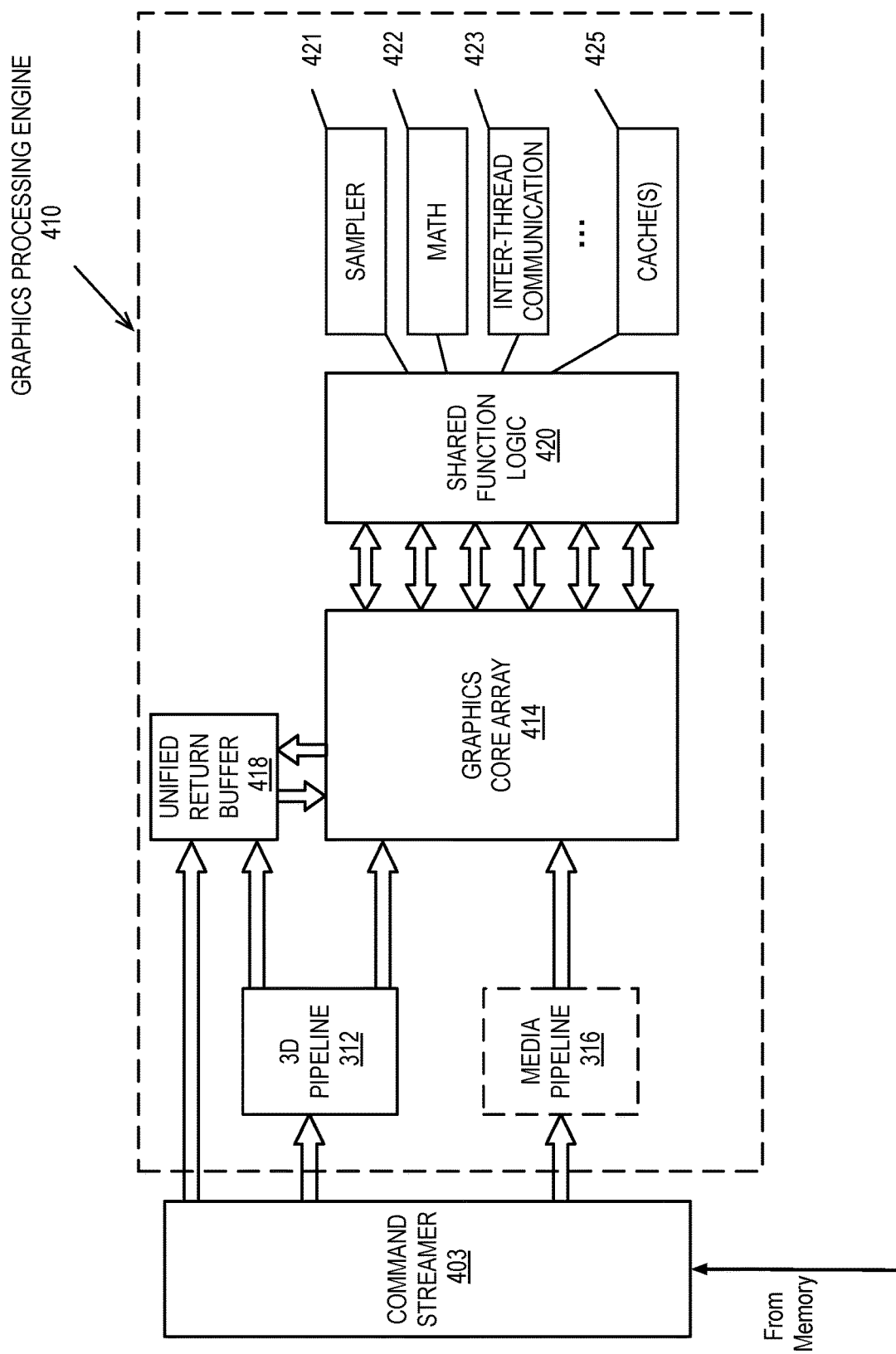
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
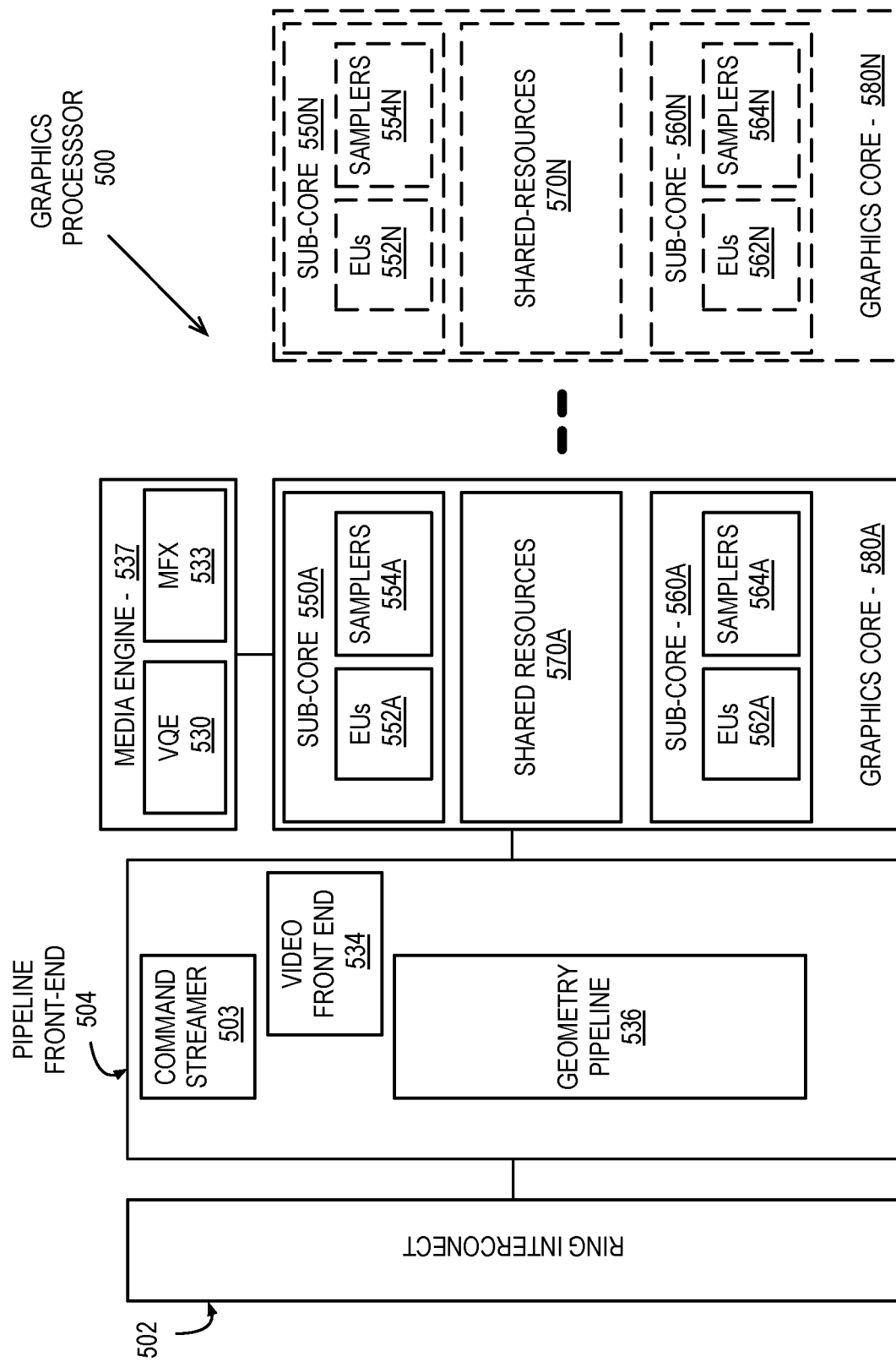
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
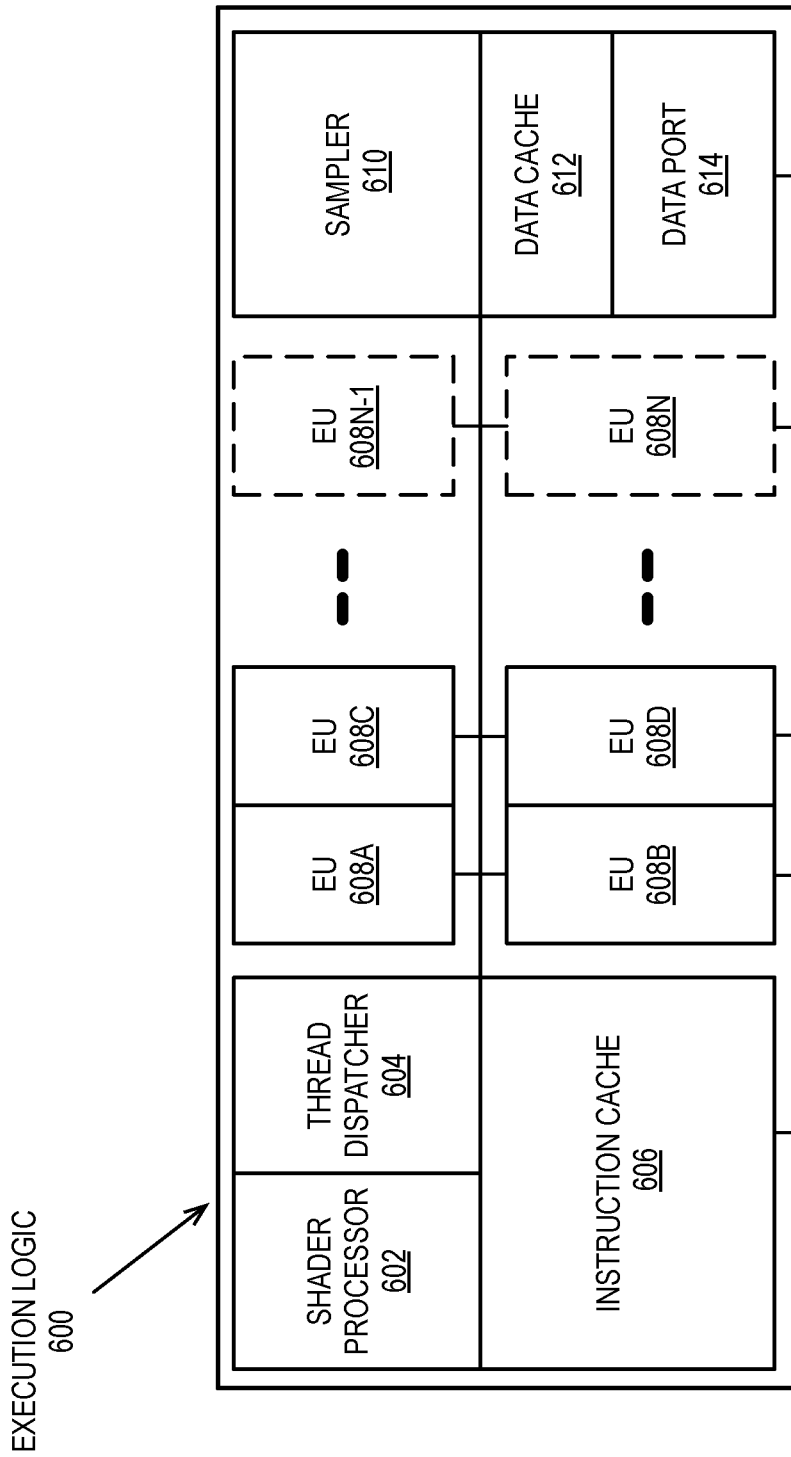
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) or single instruction multiple thread (SIMT) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit instruction format 730. The native instructions available in the 64-bit instruction format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
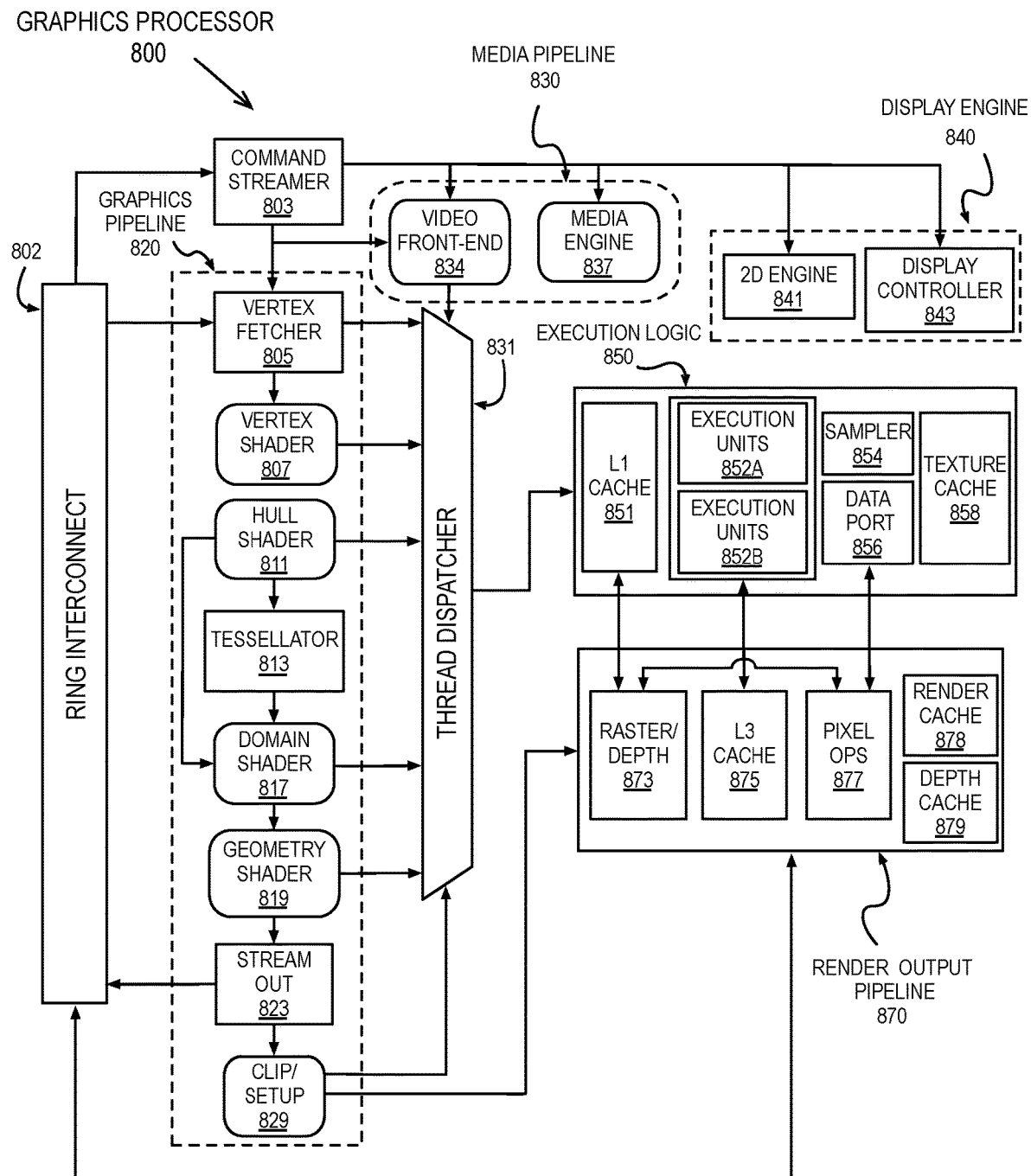
FIG. 8 is a block diagram of another embodiment of a graphics processor which includes a graphics pipeline, a media pipeline, a display engine, thread execution logic, and a render output pipeline.
Figure 9:
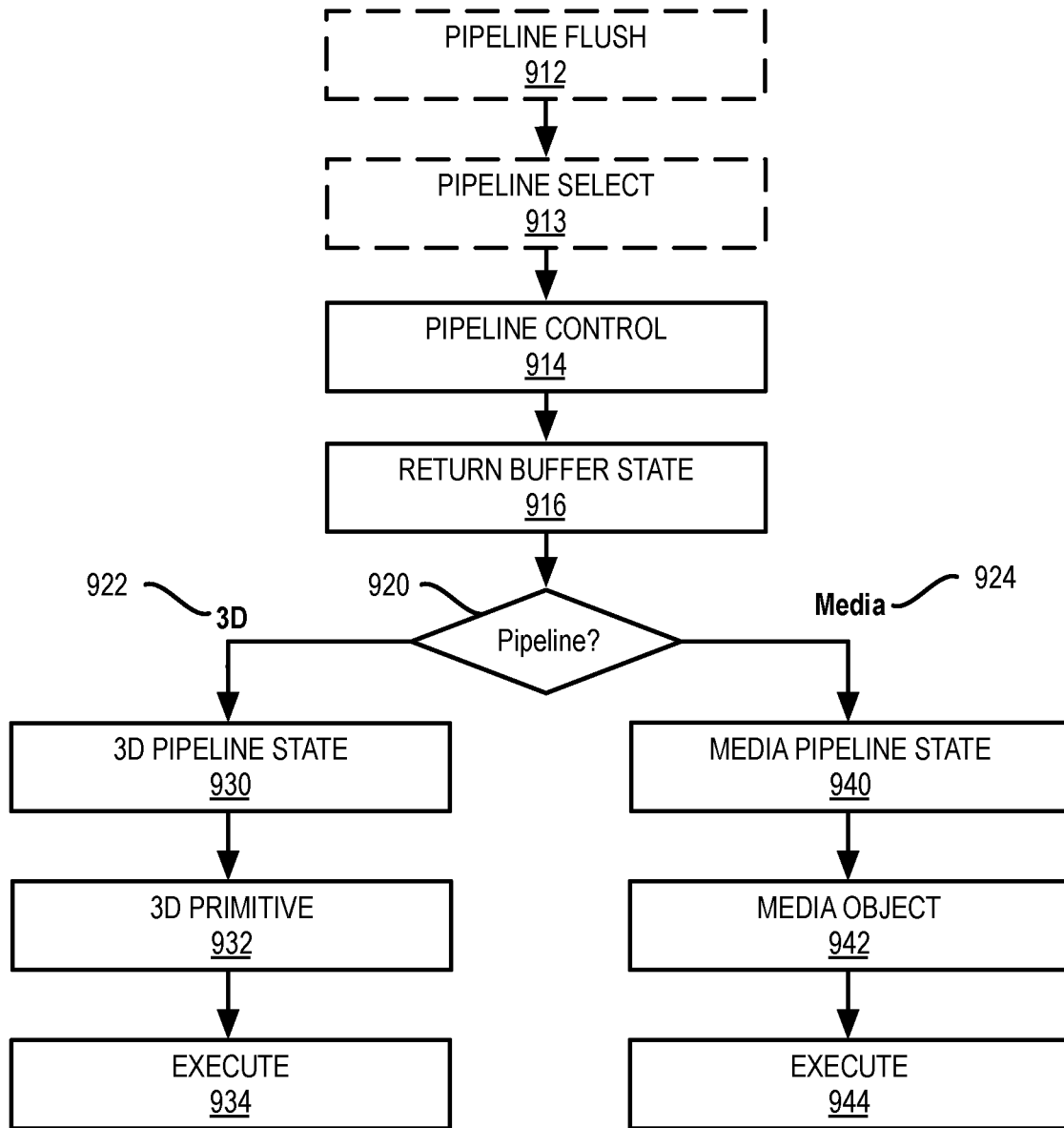
FIG. 9A is a block diagram illustrating a graphics processor command format according to an embodiment.
FIG. 9B is a block diagram illustrating a graphics processor command sequence according to an embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a depth test component and rasterizer 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, commands for the return buffer state 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, configuring the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
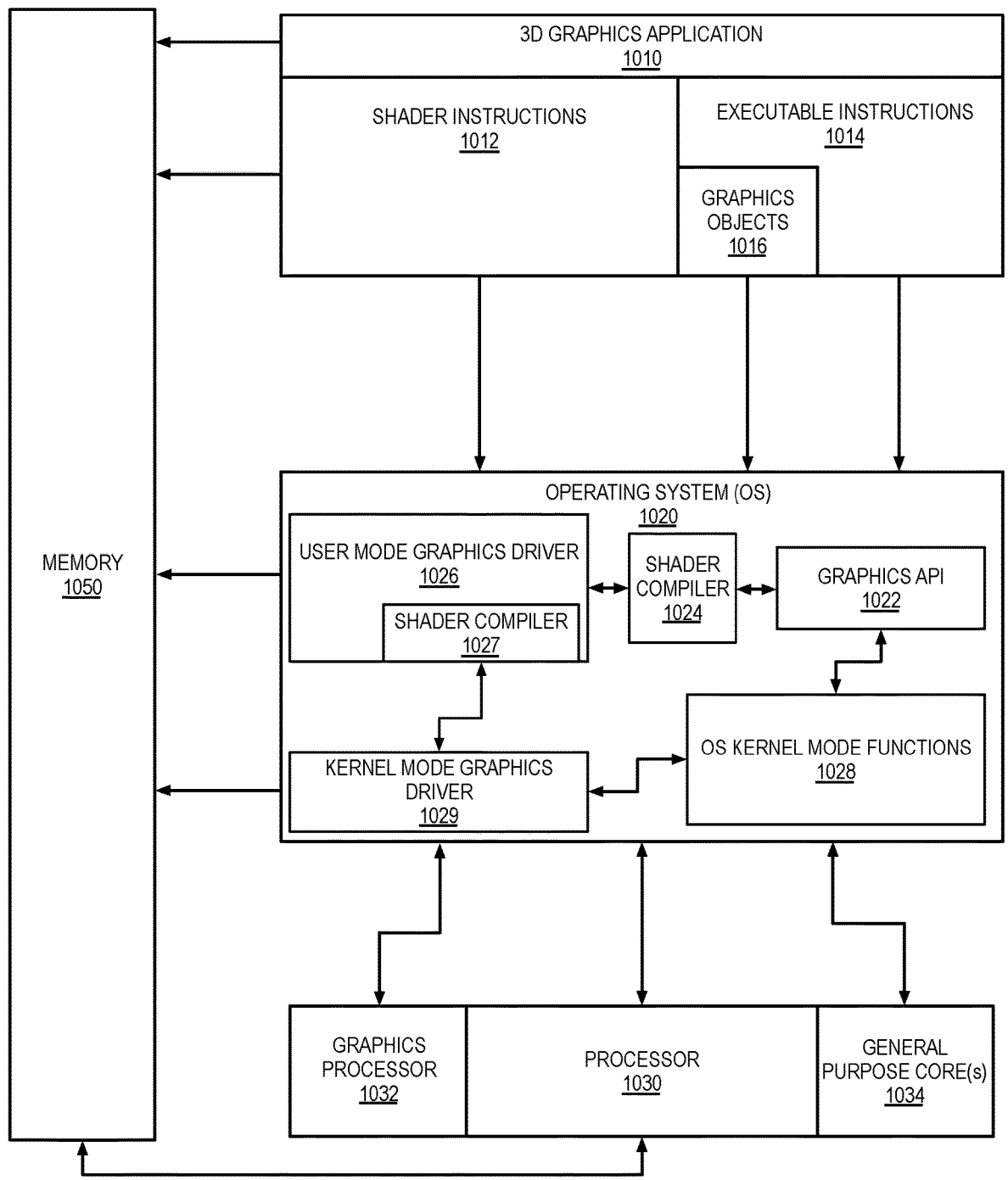
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core(s) 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
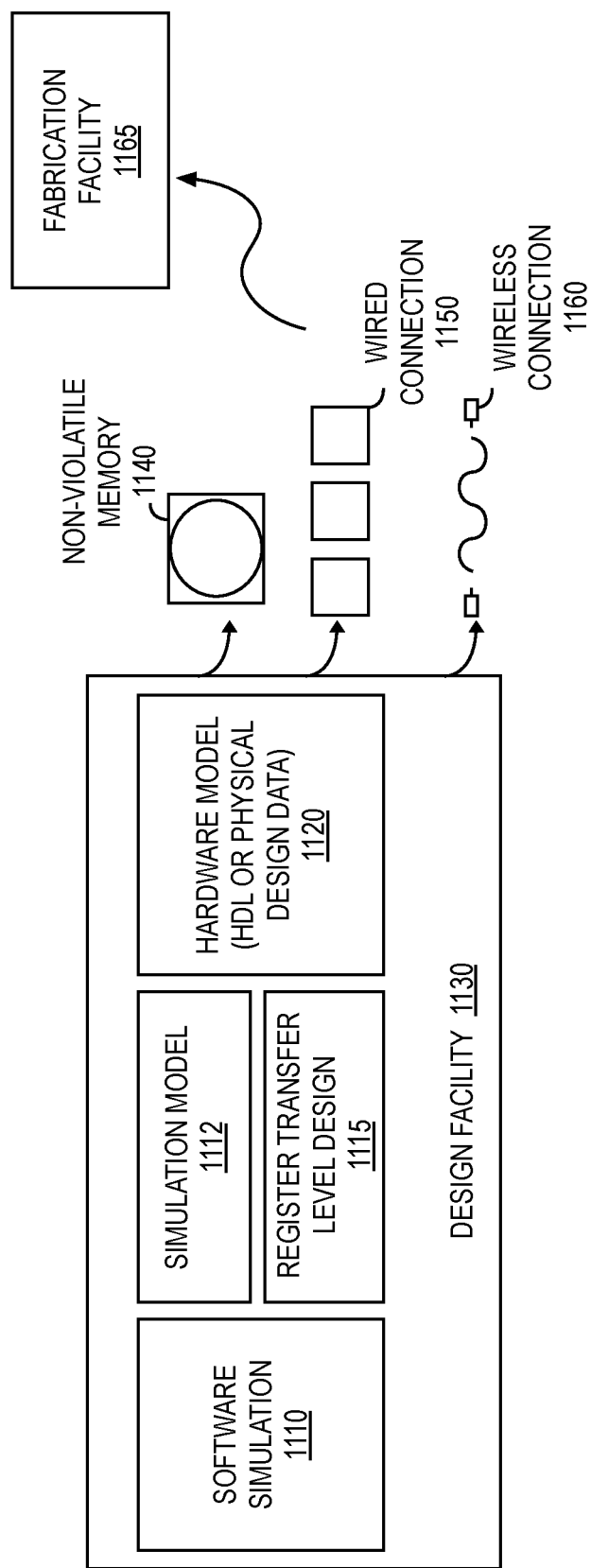
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Exemplary System on a Chip Integrated Circuit

Figure 12:
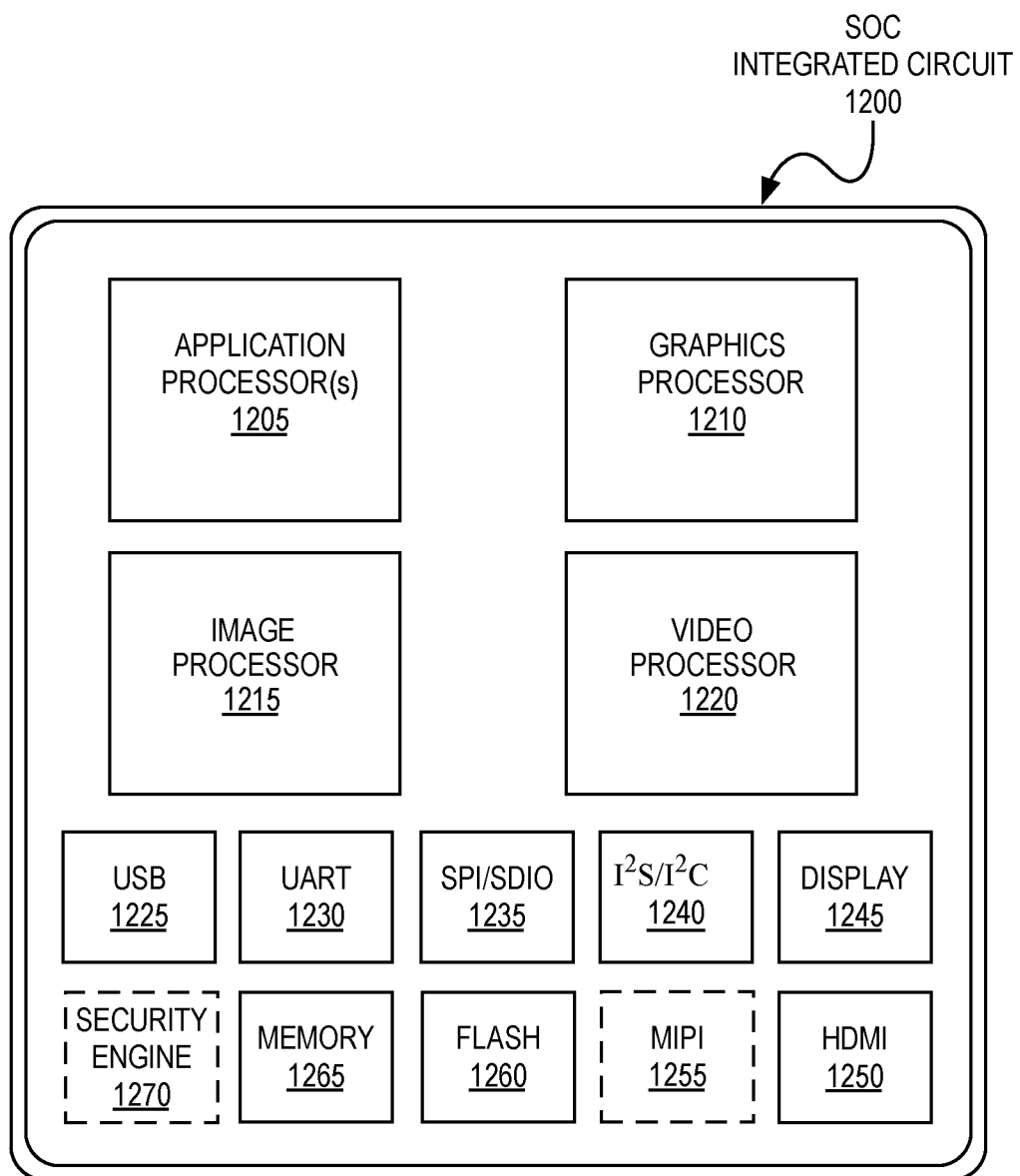
FIG. 12 is a block diagram illustrating an exemplary system on a chip integrated circuit that may be fabricated using one or more IP cores, according to an embodiment.
Figure 13:
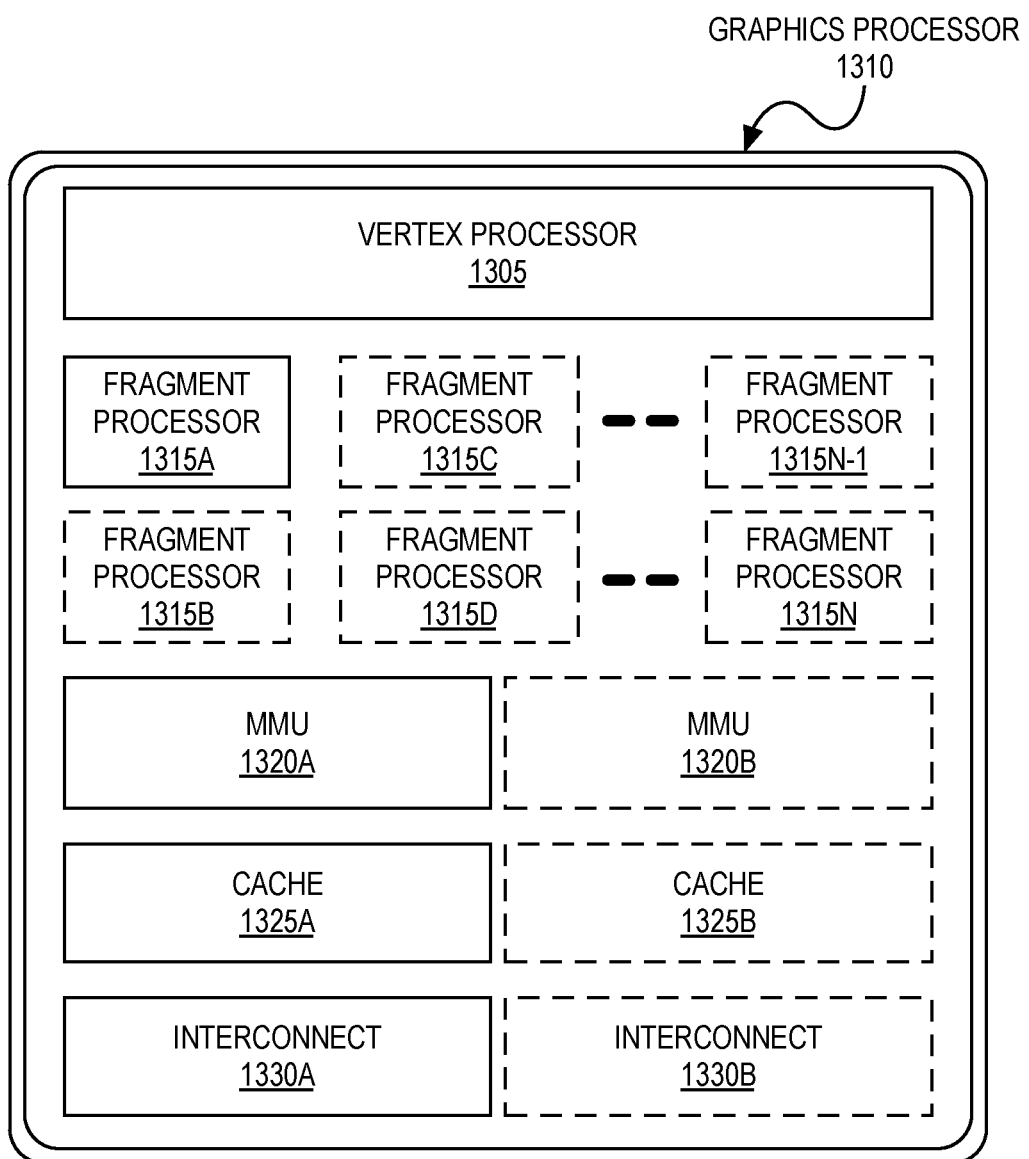
FIG. 13 is a block diagram illustrating an exemplary graphics processor of a system on a chip integrated circuit.
Figure 14:
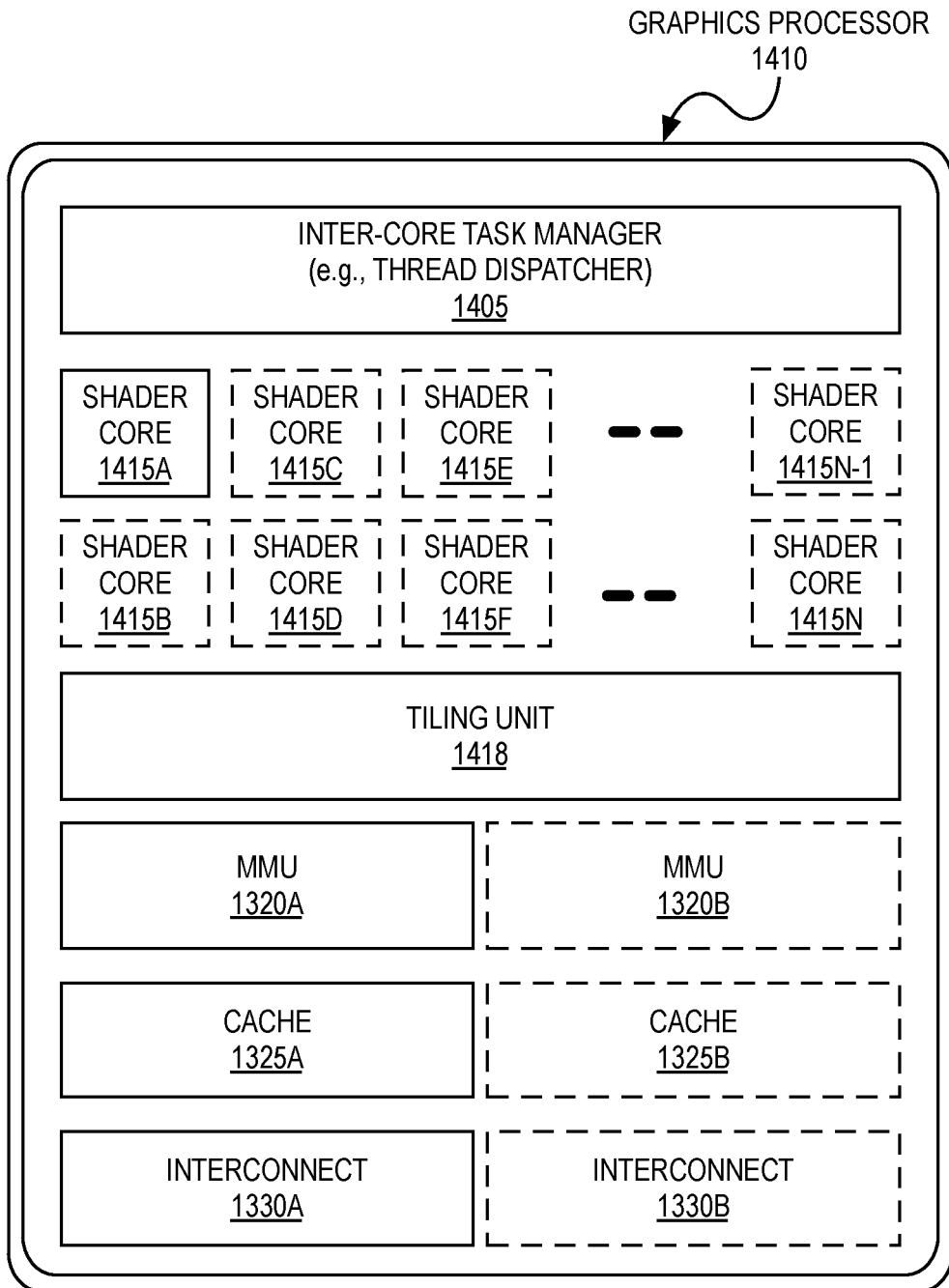
FIG. 14 is a block diagram illustrating an additional exemplary graphics processor of a system on a chip integrated circuit.

FIGS. 12-14 illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13 is a block diagram illustrating an exemplary graphics processor 1310 of a system on a chip integrated circuit that may be fabricated using one or more IP cores, according to an embodiment. Graphics processor 1310 can be a variant of the graphics processor 1210 of FIG. 12. Graphics processor 1310 includes a vertex processor 1305 and one or more fragment processor(s) 1315A1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

FIG. 14 is a block diagram illustrating an additional exemplary graphics processor 1410 of a system on a chip integrated circuit that may be fabricated using one or more IP cores, according to an embodiment. Graphics processor 1410 can be a variant of the graphics processor 1210 of FIG. 12. Graphics processor 1410 includes the one or more MMU(s) 1320A-1320B, cache(s) 1325A-1325B, and circuit interconnect(s) 1330A-1330B of the integrated circuit 1300 of FIG. 13.

Graphics processor 1410 includes one or more shader core(s) 1415A-1415N (e.g., 1415A, 1415B, 1415C, 1415D, 1415E, 1415F, through 1315N-1, and 1315N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1410 includes an inter-core task manager 1405, which acts as a thread dispatcher to dispatch execution threads to one or more shader core(s) 1415A-1415N. Graphics processor 1410 additionally includes a tiling unit 1418 to accelerate tiling operations for tile-based rendering, in which rendering operations for a scene are subdivided in image space. Tile-based rendering can be used to exploit local spatial coherence within a scene or to optimize use of internal caches.

Compression of Data within a Graphics Processor

It is common to utilize a graphics processor (e.g., GPU) to generate a two-dimensional image from a three-dimensional (3D) model, particularly where complex 3D models are used. Memory transmission bandwidth and storage footprints are often highly valued resources when rendering an image, due to the expense of placing sufficiently fast memory near the GPU (e.g., caches and local graphics memory) and the reduced bandwidth associated with accessing data from system memory. Compression, both lossy and lossless, can be employed to realize reduce transmission bandwidth and increased storage efficiency for data stored in cache memory, or other memory that is on-die, on package, on-board memory, or otherwise 'near' the GPU in terms of access latency and/or bandwidth.

The tradeoff between lossy and lossless compression represents a tradeoff between storage efficiency and output quality for compressed data. This includes relative image quality (e.g., error) for compressed image or the associated loss of computational precision for other compressed data. In some circumstances, some degree of data loss is deemed acceptable. For example, lossy texture compression algorithms are implemented in many GPUs to improve storage and transmission efficiency with texture maps, as a certain degree of blending or filtering is commonplace with texture processing. In other circumstances, lossless compression is highly preferred, such as in the instance of frame buffer compression. Lossy frame buffer compression is generally avoided due to the potential compounding of error that can occur over multiple uses of lossy compression unless some upper bound can be placed on accumulated error. In other instances, particularly for data to be consumed by the GPU, is any data compression is to be performed, the compression must be lossless. For example, lossy compression of vertex buffer or depth buffer data may introduce significant errors in the rendered output.

Described herein are several embodiments which provide for enhanced data caching in combination with adaptive and dynamic compression to increase the storage efficiency and reduce the transmission bandwidth of data during input and output from a GPU. The techniques described herein can reduce the need to access off-chip memory, resulting in improved performance and reduced power for GPU operations.

Figure 15:
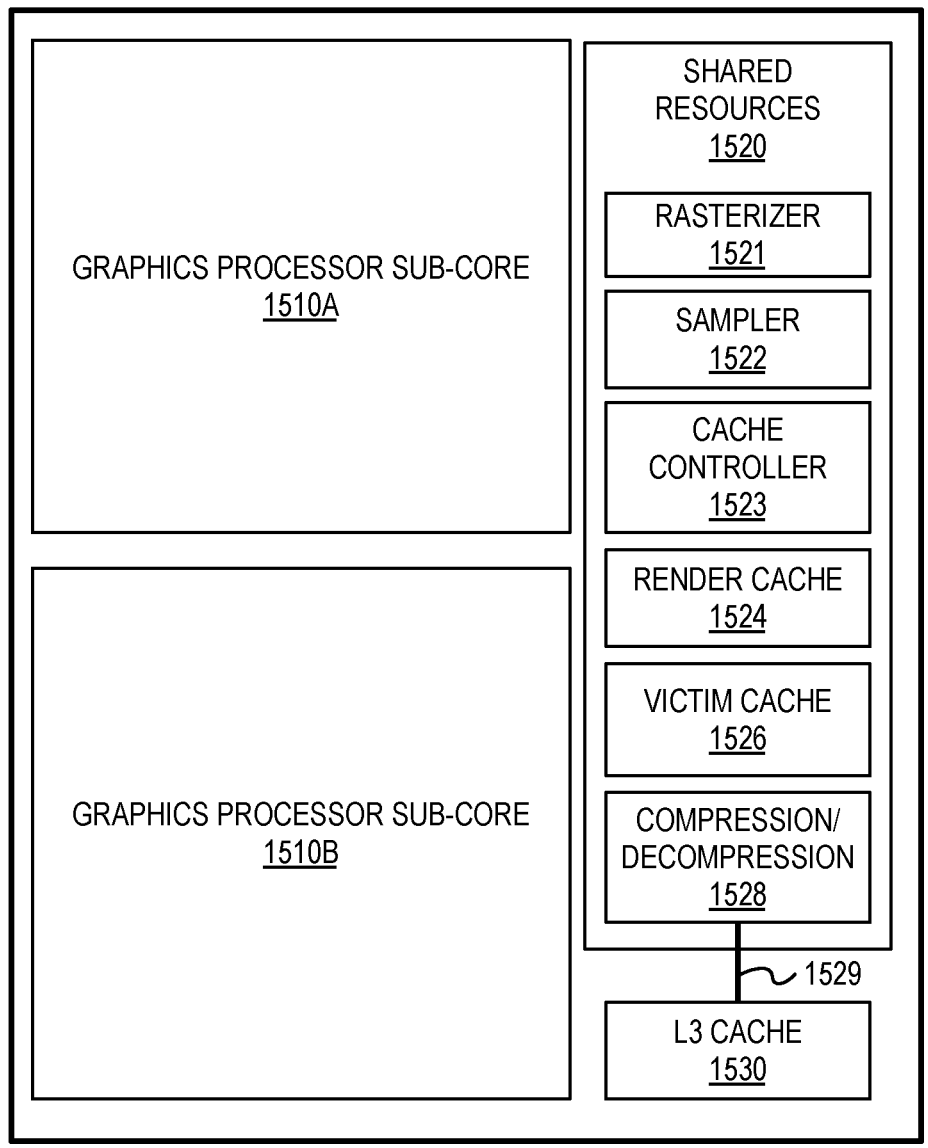
FIG. 15 is a block diagram of graphics processor, according to an embodiment.

FIG. 15 is a block diagram of graphics processor 1500, according to an embodiment. The graphics processor 1500 includes compression/decompression logic 1528, which according to various embodiments, can compress or decompress various types and formats of GPU data at various points along the graphics processor rendering pipeline. The graphics processor 1500 represents one graphics processor core. In various embodiments a GPU can include a single core or multiple graphics cores. The graphics processor 1500 includes one or more graphics processor sub-cores 1510A-1510B that may be configured to perform various graphics processing operations. While two sub-cores 1510A-1510B are illustrated, embodiments are not so limited, as the graphics processor can include a single sub-core or three or more sub-cores.

Each of the graphics processor sub-cores 1510A-1510B includes graphics processing logic such as the graphics processing sub-core 550A and/or sub-core 560A as in FIG. 5. The graphics sub-cores 1510A-1510B share a set of shared resources 1520, which include components found, for example, in the shared resources 570A of FIG. 5. The graphics core additionally includes a level three (L3) cache 1530 which can cache memory transactions between caches within the shared resource 1520 and a last level cache or system memory. The L3 cache 1530 connects with the shared resources 1520 via a memory bus 1529.

In one embodiment the shared resources 1520 include a rasterizer 1521, a sampler 1522, a cache controller 1523, a render cache 1524, a victim cache 1526, and compression/decompression logic 1528. The rasterizer 1521 includes a windower/masker unit, which in one embodiment performs fixed function triangle and line rasterization and is a variant of the rasterizer and depth test component 873 as in FIG. 8. The rasterizer 1521 analyzes data representing a geometric object to be rendered by traversing, or walking, a primitive and generating pixel data for each pixel that is part of a geometric primitive to be rendered. The graphics processor 1500 can also include a more advanced and/or configurable rasterizer or may additionally include ray tracing acceleration logic to accelerate ray tracing or hybrid rasterization. In one embodiment the rasterizer 1521 is a tile-based rasterizer, in which pixels are rendered on the granularity of an image space grid of pixels. Tile-based rasterization can be performed on data stored in tile caches to reduce the number of off-chip memory accesses.

The sampler 1522 provides texture sampling for 3D operations and media sampling for media operations. In one embodiment the sampler is a variant of the sampler 610 as in FIG. 6. The sampler 1522 can access render target data stored in the render cache 1524, for example, when dynamically rendered textures are in use, or when the graphics processor otherwise has an operational need to sample data from a render target.

The render cache 1524 stores render target data to be displayed via display engine or to be used to render subsequent images for display. Data generated by the graphics sub-cores 1510A-1510B can be written to the render cache 1524, where such data may be readily accessed by other graphics processor components, such as the display engine or the sampler 1522. Memory within the render cache is divided into cache lines. While the size of the cache lines can vary among embodiments, one embodiment provides for 128-byte cache lines. In one embodiment the render cache 1524 can be configured as a multi-sample render cache and can store multiple samples of color data per-pixel.

In one embodiment the render cache 1524 is controlled by a cache controller 1523. The cache controller 1523 manages cache line allocation for data to be stored in the render cache 1524 and/or the victim cache 1526 and maintains status information for the cache lines of the render cache 1524. Components within the graphics processor core can query the cache controller 1523 to determine if data for a particular pixel or group of pixels is stored in the render cache 1524 and/or victim cache 1526 and to determine which cache lines store such data. In one embodiment the cache controller 1523 is also involved in maintaining cache coherence between the render cache 1524 and other caches in the graphics processor.

In one embodiment a victim cache 1526 couples to the render cache 1524 to store write back data that is evicted from the render cache. The victim cache 1526 can be sized relative to the render cache 1524. In one embodiment, each of the render cache 1524 and the victim cache 1526 are fully associative (e.g., m-way set associative). In one embodiment the victim cache 1526 may be a set associative cache. When data is evicted from the render cache 1524 in favor of newly stored data, instead of being written, for example, to the L3 cache 1530, the data is at least temporarily stored in the victim cache 1526. If the render cache 1524 subsequently requires the evicted data, the data can be retrieved from the victim cache 1526 instead of the higher level of the memory hierarchy to which the evicted data would have otherwise been written.

A compression boundary for compressed data can be configured such that data is compressed or decompressed before transiting a specific boundary in the memory hierarchy. For example, data can be stored in a render cache 1524 in a compressed format or can be decompressed before being written to the render cache 1524. In one embodiment, data that is evicted from the render cache and/or the victim cache, a compression operation can be performed by the compression/decompression logic 1528 to compress the evicted data before the data is written to the L3 cache 1530 and/or system memory via the memory bus 1529. Whether data is stored in a compressed or uncompressed format at a given location in memory may be determined based on whether graphics processor components that will consume the data from a given memory unit support reading data in a compressed format.

In one embodiment, tile-based compression is used, in which pixel data for an N×M tile is pixels is stored in cache or in memory in a compressed state. Various tile sizes may be used, including but not limited to an 8×4 tile or a 4×4 tile of pixels. Accompanying compressed data is compression metadata which maintains a compression status for a given cache line or tile. The compression metadata can include one or more bits per tile, cache line, cache block, etc., to indicate status such as compressed or uncompressed, or to indicate a particular form of compression that is in use. In many lossless compression implementations, if the input data cannot be compressed to the desired compression ratio without data loss, the data may be output or stored in an uncompressed state.

Lossless Compression of Read-Only Surface Data

Many compression techniques are applied data generated by the GPU, such as color data, depth (e.g., Z) data, or other buffers written or otherwise output via the GPU, for example as described with respect to FIG. 15. In addition to GPU generated data, the GPU consumes some static data during the rendering operations. This static data is read-only data from the GPU perspective and includes, but is not limited to static texture buffers, vertex buffers, constant buffers, uniform buffers, or other static or constant input buffers to the GPU. The static read-only data may also be constant data used by a compute shader or other general purpose parallel computation logic within the GPU. Memory surfaces containing such data can be compressed once and used in multiple frames or multiple shader instances if the data can be compressed without data loss. Metadata can be associated with the compressed data to indicate a compression status (e.g., compressed or uncompressed) for the data. When a static (e.g., read only) resource is bound to a GPU pipeline, the corresponding meta-data is also bound. In one embodiment the metadata binding is performed via a bindless resource scheme. In one embodiment the metadata can be bound via legacy resource binding. Compression and decompression of the data can be performed on the fly and in real time, reducing the memory bandwidth required to load and store static or read-only data streams.

In one embodiment, lossless compression of read-only surface data can be configured such that, for any read-only surface, the color codec is used to perform lossless compression. The surface is subsequently treated as a lossless compressed surface. When a shader kernel is accessing the read-only data, the data will be accessed via a color data cache (e.g., render cache) using lossless decompression logic associated with the cache or via another decompression logic that can be inserted where appropriate in the architecture.

Figure 16:
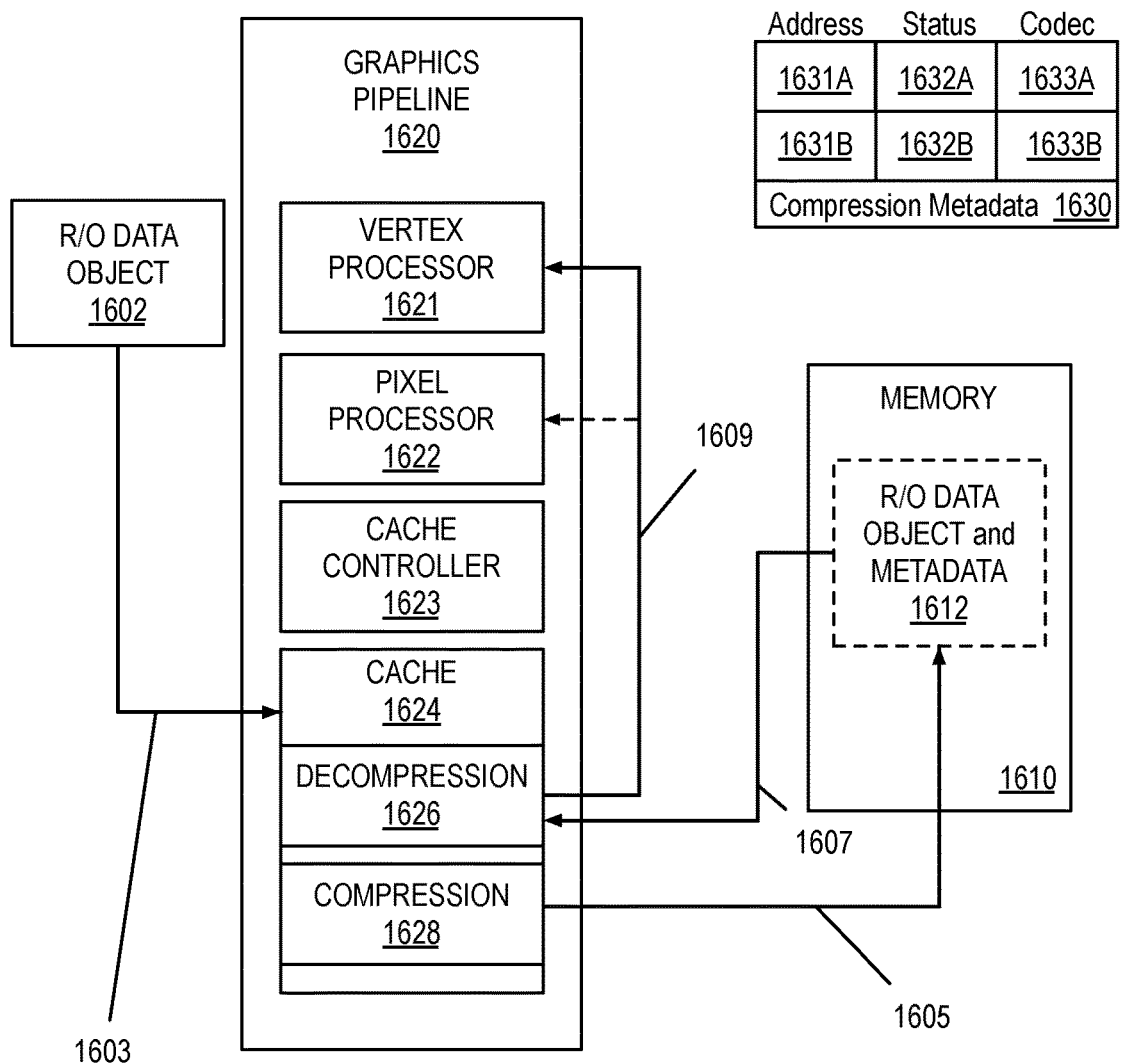
FIG. 16 is a block diagram of a graphics processing system, according to an embodiment.

FIG. 16 is a block diagram of a graphics processing system 1600, according to an embodiment. The graphics processing system can be implemented using graphics processing logic, such as the graphics processor 1500 as in FIG. 15.

As illustrated, the graphics processing system 1600 includes a graphics pipeline 1620 including vertex processor 1621, a pixel processor 1622, a cache controller 1623, and a cache 1624. In one embodiment the cache 1624 is a render target cache that includes or is associated with decompression 1626 and compression 1628 logic. The graphics pipeline 1620 can couple to an additional memory 1610, which can include a higher level of cache memory, local memory, system memory, or other memory in which a surface for use by the graphics processor may be stored.

In response to a request to associate a read only data object 1602 (R/O Data object) with the graphics pipeline 1620, a graphics processor can create or copy the read only data object 1602 to memory 1610. In one embodiment, the data for the read only data object 1602 is transferred (1603) to the memory 1610 through the cache 1624. In one embodiment, data for the read only data object 1602 is written to the cache 1624 and can be processed by the compression 1628 logic when written (1607) to the memory 1610. In one embodiment, data for the read only data object is processed by the compression 1628 logic before or during the write to the cache 1624 before the data is written (1607) to the memory 1610.

The compression 1628 logic can attempt to losslessly compress the data for the read only data object 1602 via a lossless color compression algorithm, such as a delta color compression algorithm or another lossless compression algorithm suitable for compressing color data. A potentially compressed read only data object and metadata 1612 block can be stored in the memory 1610 if the lossless compression is successful. The metadata of a read only data object and metadata 1612 block indicates the compression status of data associated with the read only data object 1602. If the compression 1628 logic is able to compress a data tile of the read only data object 1602 without loss of data, the tile of the read only data object and its metadata 1612 in memory stores compressed data and one or more metadata flags or bits that indicate the compression status of the data. If the compression 1628 logic is not able to compress a tile of the read only data object 1602 without loss, then uncompressed data of the tile is stored in the read only data object and metadata 1612 and one or more metadata flags or bits can be set to indicate that the data is uncompressed. As a result, the entire read only object will have some data tiles that are compressed and some that are uncompressed, and in subsequent accesses to this read only object, all accesses will go through this compressed and uncompressed version of the read only object.

The data stored in the read only data object 1602 need not be the type of data that is normally stored in the cache 1624. For example, if the cache 1624 is a render cache, vertex data would not normally be stored in the cache 1624. However, a portion of the cache 1624 can be configured to enable streaming compression of non-color buffer data during a write to the memory 1610. Additionally, in some implementations data stored in the cache 1624, such as color buffer data (e.g., frame buffer data or render target data) remaining from a previous scene may be flushed or discarded if that data will not be relevant to the current frame and the entire cache 1624 may be used to compress data from the read only data object 1602. Depending on the type of data to be compressed, the data from the read only data object 1602 can then be automatically discarded or invalidated via the cache controller 1623 once the compression operations are complete.

Although the read only data object and metadata 1612 is illustrated as a single block, embodiments are not so limited. In one embodiment a separate compression control surface is maintained that tracks compression status metadata for various blocks of data in the memory 1610. The compression control surface can be a block of memory that is stored in any memory location accessible to the graphics pipeline 1620. The compression control surface can store metadata for multiple blocks of memory, indicating whether each block is compressed or uncompressed, as well as any other information that may be relevant for managing this data. In one embodiment the cache controller 1623 can access the compression control surface to determine whether cached data associated with a block of memory should be compressed before evicting cached data associated with that block of memory. Other portions of a graphics processor can access the compression control surface before accessing various chunks of data stored in memory 1610.

In one embodiment a compression control surface stores data similar to the data illustrated in the exemplary compression metadata 1630, although the compression metadata 1630 may also be stored with or in associated with the read only data object and metadata 1612. The compression metadata 1630 includes but is not limited to address, status, and codec information. An address 1631A, which can be associated with a block of compressed memory of known or pre-determined granularity (e.g., page, etc.), such that compression information can be maintained for multiple blocks of data. For example, compression control for address 1631A can be maintained separately form address 1631B. Status and codec information can be maintained for the addresses, and the precise use of those fields can vary among embodiment. In one embedment, status 1632A for address 1631A can indicate whether the data at address 1631A is compressed or uncompressed, and codec 1633A can indicate the type of compression that has been used for the data, such as, for example, lossless color compression. Alternatively, the status field can be used to store other information and the codec field can indicate whether data is compressed or uncompressed, as well as the type of compression in use. For example and in one embodiment, address 1631B can track a block of data stored in memory and status 1632 can store status such as coherency data (e.g., cache coherency, etc.) while codec 1633B stores an indication of whether the data at address 1631B is compressed or uncompressed, as well as the type or degree of compression that has been used.

Without regard to the various types and forms of compression metadata 1630, stored in conjunction with the read only object and metadata 1612, or otherwise, can be accessed to determine how the graphics pipeline 1620 is to access the read only data. In one embodiment this determination can be performed automatically by the decompression 1626 logic of the cache 1624 as the potentially compressed data read is read (1607) via the decompression 1626 logic associated with the cache 1624. The graphics pipeline 1620, via the vertex processor 1621 or the pixel processor 1622, can access (1609) data associated with the read only data object via the cache 1624 which, based on the compression status of the data, can decompress the data the data or pass through the uncompressed data.

Figure 17A:
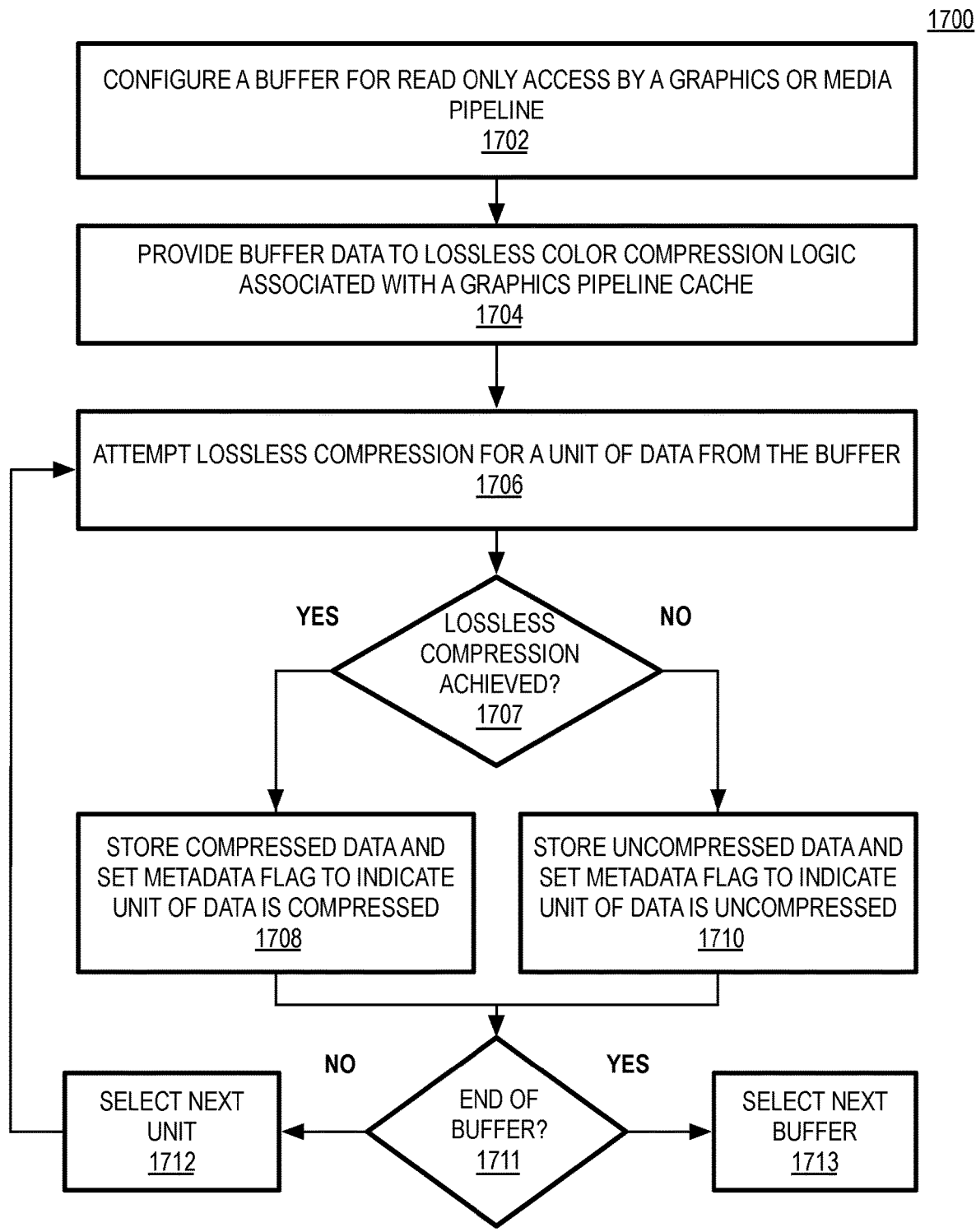
FIGS. 17A-17B illustrated exemplary logic for Lossless Compression of Read-Only Surface Data.
Figure 17B:
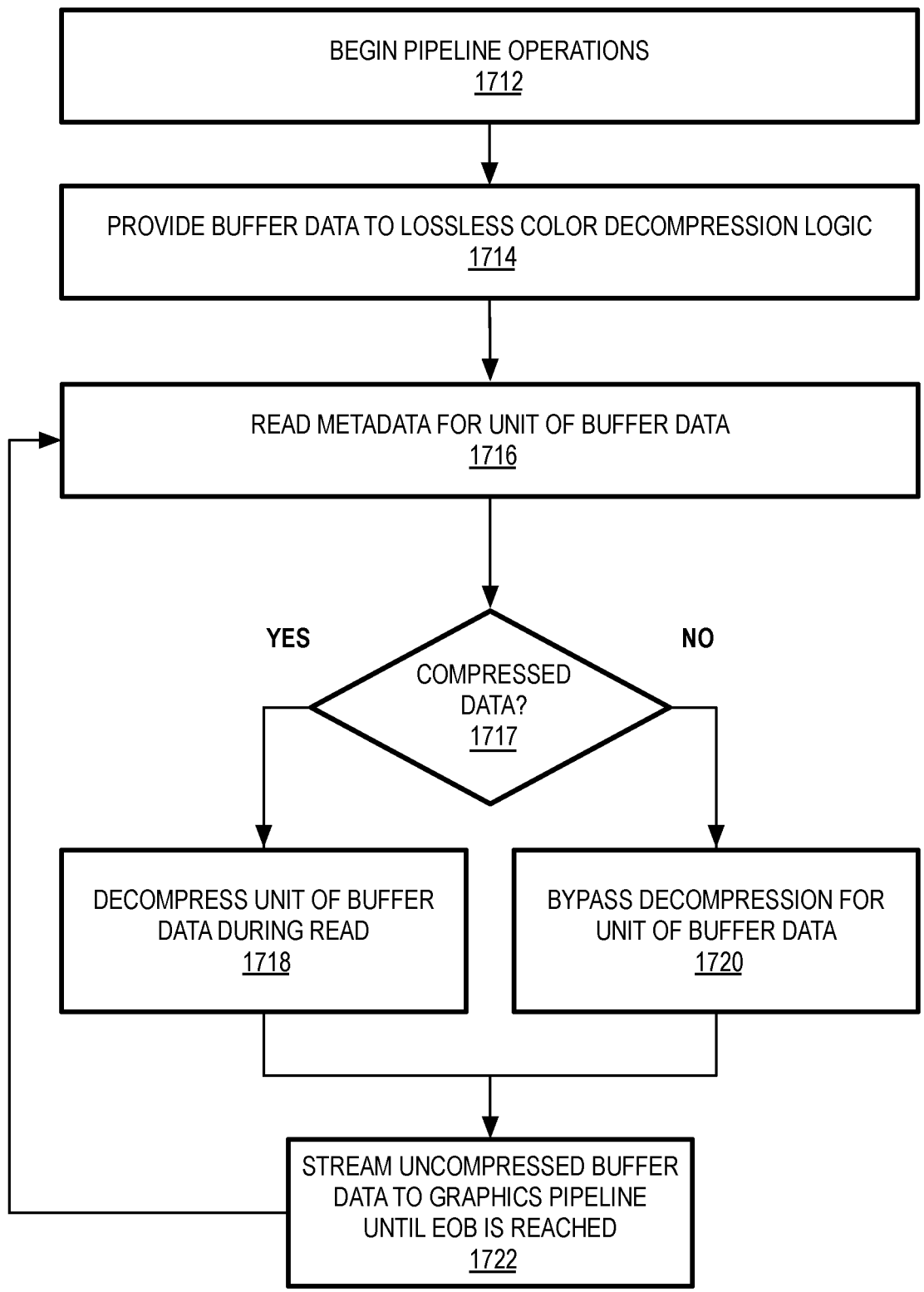

FIGS. 17A-17B illustrated exemplary logic for Lossless Compression of Read-Only Surface Data. The illustrated logic can be performed by components of the graphics pipeline 1620 of FIG. 16 in under the control of one or more 3D APIs. As shown in FIG. 17A, logic 1700 configured to compress read only data such as, but not limited to static textures, vertex buffers, constant buffers, or other static input buffers can receive input which causes the logic 1700, as shown at 1702, to configure a buffer for read only access by a graphics or media pipeline, such as the graphics pipeline 1620 of FIG. 16, the graphics pipeline 820 or media pipeline 830 of FIG. 8, or any other graphics pipeline such as the 3D pipeline 922 or media pipeline 924 of FIG. 9B. The input can be in response to an API command, such as, but not limited to a command to bind a static texture to a graphics context.

In the process of making the buffer accessible to a graphics processor (e.g., via copying or mapping the data to GPU memory) the logic 1700 can provide buffer data to lossless render target compression logic associated with a graphics pipeline cache, as shown at 1704. The logic 1700 can then attempt to perform lossless compression for a unit of data from the buffer, as shown a 1706. In one embodiment the data unit can be defined as a data tile or another unit of data upon which the color compression logic operates when performing compression operations. The data tile is thus a potentially compressible N×M unit of data in the same manner as N×M tile of pixels is a potentially compressible unit of data in the context of color data compression.

If a unit of data may be losslessly compressed (e.g., lossless compression achieved at 1707), the logic 1700 can store the compressed unit of data and set one or more metadata flags to indicate that the unit of data is compressed, as shown at 1708. If the unit of data may not be lossless compressed, the logic 1700 can store the uncompressed unit of data and set one or more metadata flags to indicate that the unit of data is uncompressed, as shown at 1710.

After the unit of data is stored in either a compressed or uncompressed format, the logic 1700 performs an end of buffer determination at 1711. If additional potentially compressible units of data are available in the buffer, the logic 1700 can select the next unit at 1712. If the last unit of data in the buffer has been stored, the logic 1700 can select the next buffer (if any) at 1713 or end this phase of logic operations.

FIG. 17B illustrates logic 1710 to access read only data that may be stored in a compressed format. As shown at 1712, when pipeline operations begin, the logic 1700 can provide buffer data to lossless color decompression logic at 1714. As shown at 1716, the lossless color decompression logic can read metadata for a unit of buffer data, which may be metadata stored in a compression control surface, metadata stored in conjunction with the unit of buffer data, or a separate bit map or data structure indicating a compression status for each data tile, or other unit of data in which the buffer data is stored. The logic 1710 can determine if the unit of buffer data is compressed buffer at 1717. If the unit of buffer data is compressed, the logic 1710 can decompress the unit of buffer data during read, as shown at 1718. If the unit of buffer data is not compressed, the logic 1710 can bypass decompression for the buffer data, as shown at 1720. The logic 1710 can then stream uncompressed (e.g., decompressed or uncompressible) buffer data to the graphics pipeline, as shown at 1722 while successive units of buffer data are processed. In one embodiment, the graphics pipeline can include additional buffer or cache memory to store the read only data stream from the decompression logic.

Combining Lossy and Lossless Compression

Graphics processors generally employ lossless compression of render target data such as, but not limited to dynamic textures or depth buffers (e.g., Z-buffers), which reduces write and read bandwidth requirements due to successive consumption of the compressed data. In one embodiment the lossless compression techniques used to reduce bandwidth while maintaining image quality can be combined with lossy compression when rendering areas of a scene that include fewer details. For example, portions of a render target that will appear blurry in a depth of field view, objects that will be subjected to motion blur, or a peripheral view under foveated rendering, can be compressed using lossy compression algorithms to save additional memory system bandwidth without a perceived loss in image quality.

In one embodiment, different forms of lossy or lossless compression can be performed on a per-tile basis, such that a first tile can include data that is losslessly compressed, while a second tile may include data that is compressed via a lossy compression algorithm. Where lossy compression algorithms are used, techniques can be applied to enforce a ceiling on accumulated error for a tile, such that the data quality of the tile can be maintained when lossy compression is in place. For each tile, a cascade of high quality to lower quality compression techniques can be applied to balance image or data quality and space efficiency of the resulting compressed data.

In one embodiment, image quality can be smoothly degraded based on an error threshold associated with the tile, block, or other defined group of pixels. A target compression rank can be determined in part via an API defined policy or profile that can specify a target or minimum image quality. A compression policy can be defined in which compression logic can attempt to achieve a compression ratio target associated with the policy. Based on the policy, if a tile cannot be losslessly compressed to a target compression ratio, lossy compression will be attempted at the target compression ratio. If lossy compression cannot be performed without exceeding a defined error tolerance, a lower compression ratio target may be attempted for lossless compression before falling back to lossy compression at the lower compression ratio target.

In one embodiment a bandwidth saving profile can progress through the compression targets as shown in Table 1 below.

TABLE 1

Lossless to Lossy Compression Hierarchy

| Rank | Compression Ratio | Lossy/Lossless |
|---|---|---|
| 1 | 4:1 | Lossless |
| 2 | 4:1 | HQ Lossy |
| 3 | 2:1 | Lossless |
| 4 | 2:1 | Lossy |
| 5 | 1:1 | Lossless |

The bandwidth saving compression profile can be applied to a tile, block, or grouping of pixels and a progression from highest possible bandwidth savings to lower level of bandwidth savings can be attempted basis based on the compressibility of the data to be compressed. As shown in Table 1, highest bandwidth savings can be realized by 4:1 lossless compression, followed by 4:1 high quality lossy compression. In the case of the high quality lossy compression, a lower bound in image quality can be applied to limit the amount of compression error that may be accumulated for a tile. Lower bandwidth savings can be realized with 2:1 lossless compression and 2:1 lossy compression, while a 1:1 lossless (e.g., uncompressed) format can be used for data that cannot be losslessly compressed or that cannot tolerate the data loss associated with lossy compression.

In one embodiment the policy or profile can also change the hierarchy ranking to prefer lossless compression to lossy compression. A 'prefer-lossless' profile can be defined in which the preferred hierarchy is as illustrated in Table 2 below.

TABLE 2

Prefer-Lossless Compression Hierarchy

| Rank | Compression Ratio | Lossy/Lossless |
|---|---|---|
| 1 | 4:1 | Lossless |
| 2 | 2:1 | Lossless |
| 3 | 4:1 | HQ Lossy |
| 4 | 2:1 | Lossy |
| 5 | 1:1 | Lossless |

Based on the profile or policy applied to a tile or block of pixels, varying forms of compression can be applied. In one embodiment, multiple forms of compression (e.g., lossy or lossless) at different compression ratios can be attempted for a given tile or block of pixels and based on the compressibility of the pixel data. For example, a tile, block, or other grouping of pixels that has been defined as having a lower quality requirement can be compressed using lossy compression, while a tile, block, or other grouping of pixels having a higher quality requirement can be compressed using lossless compression. The compression logic can then attempt to achieve a compression target based on the compressibility of the data. For example, if a tile of pixels has color data that cannot be losslessly compressed at, for example, a 4:1 compression ratio, a 2:1 compression ratio can be attempted. The logic can be configured to fall back to lossy compression if a given block of color data cannot be losslessly compressed or can be configured to only use lossless compression. In one embodiment, compression metadata is stored for each tile indicating the resulting compression type (e.g., lossy or lossless) and corresponding compression ratio. The compression metadata can then be used in the decompression and decoding of the tile.

While specific compression ratios are used for exemplary purposes (e.g., 4:1, 2:1, 1:1) the specific compression ratios illustrated are exemplary of one embodiment but not limiting as to all embodiments, as higher compression ratios may be used.

Figure 18:
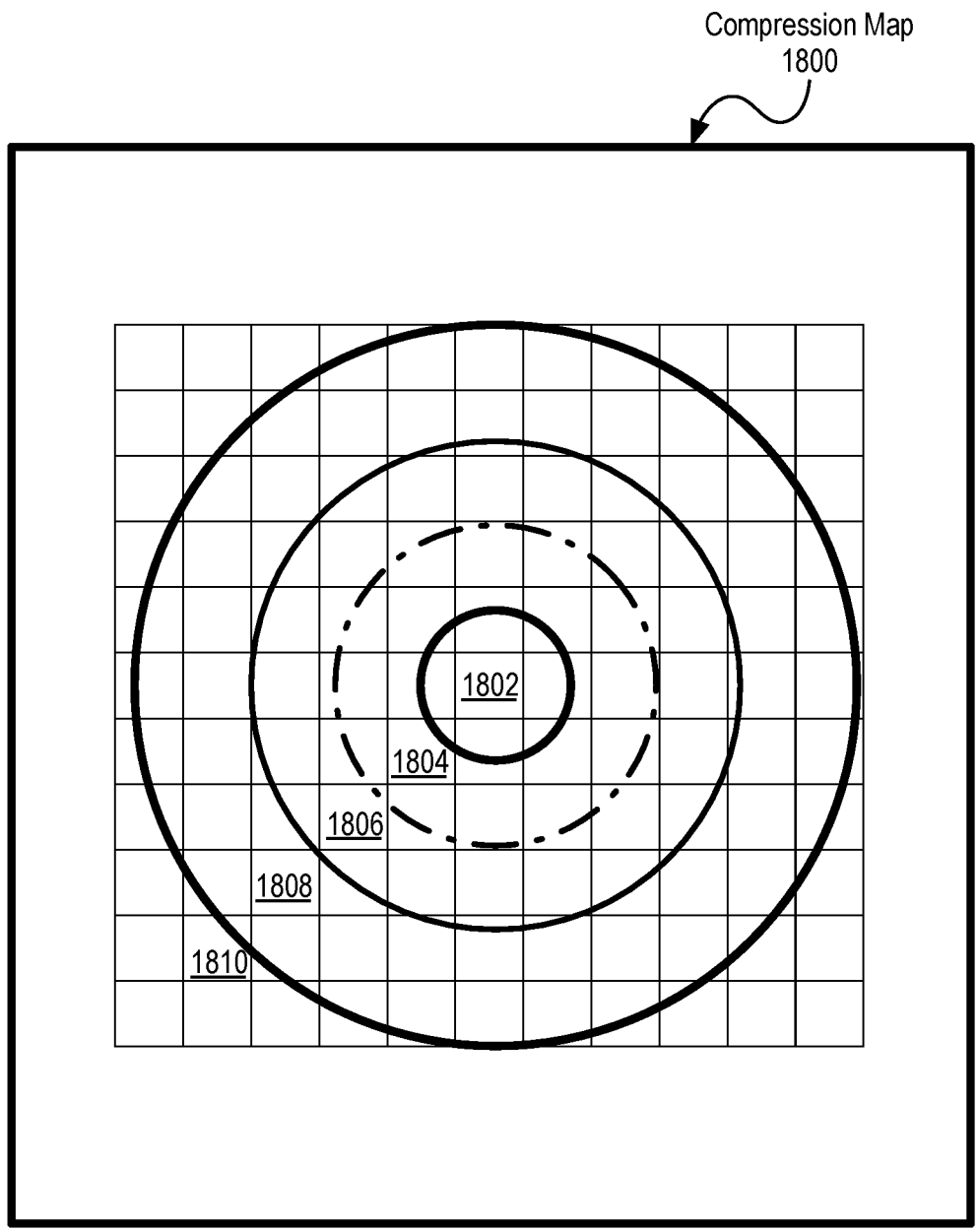
FIG. 18 illustrates one example of combining lossless and lossy compression.
Figure 18B:
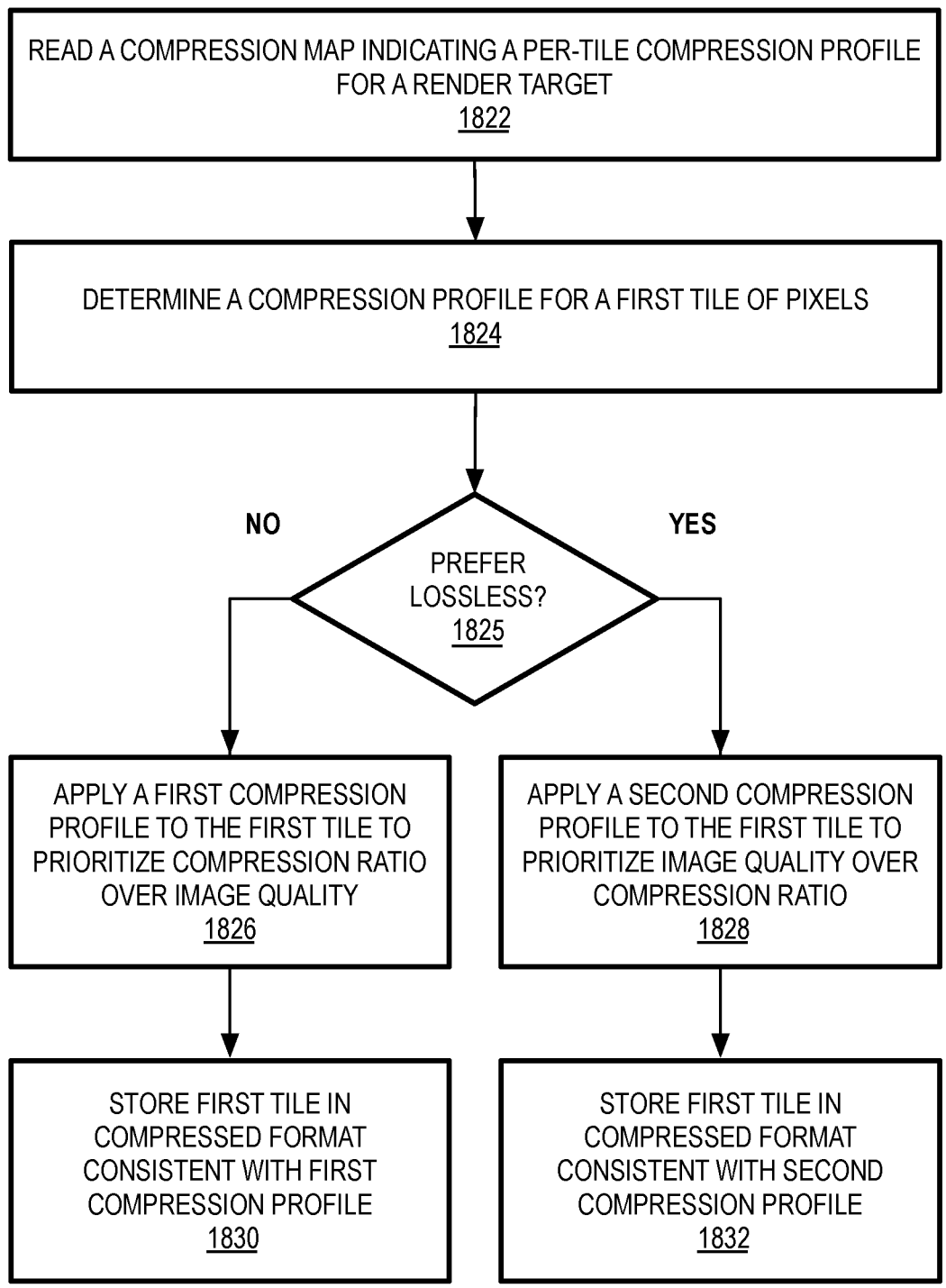

FIGS. 18A-18B illustrates one example of combining lossless and lossy compression. FIG. 18A shows a compression map 1800 that can be used in the case of foveated rendering. Foveated rendering can be used, in one implementation, when rendering data for a head mounted display. Eye tracking logic can be used to determine the eye position of a user and the scenes rendered for display can be rendered at differing quality at different portions of the scene based on whether the scene will be perceived by the foveal or peripheral vision of the user. Where eye tracking logic is not in place for a head mounted display, these techniques can also be applied based on the varying degrees of radial or chromatic aberrations that may appear due to distortion caused by lenses used in a head mounted display.

In one embodiment the compression map 1800 is a bitmap or another data structure defined for a scene that indicates the compression profile to apply for each tile or grouping of tiles. Based on the defined compression profile, color compression logic can attempt to maximize bandwidth savings during color buffer compression or maximize image quality while saving as much bandwidth as possible without losing image quality. For example, tiles at or near the focal point of a view for a scene (e.g., tile 1802, tile 1804) can be compressed with only lossless compression to preserve image quality. If a first lossless compression ratio (e.g., 4:1) cannot be achieved, a lower lossless compression ratio (2:1) is attempted. If lossless compression cannot be performed on the data, then the data is stored uncompressed. For tiles further away from the focal point (e.g., tile 1806), lossless compression can be preferred but lossy compression can still be used to preserve bandwidth. For tiles near the periphery of the view (e.g., tile 1808, tile 1810), a bandwidth preserving profile can be used that attempts to favor higher compression ratios, even at the expense of some loss in image quality.

Foveated rendering is described as but one example in which lossy and lossless compression techniques can be combined for data within a scene. Such techniques can be applied at any point in a graphics pipeline in which color data and/or render target compression is performed. Such techniques can also be applied when using color compression logic to compress read only input data to a graphics pipeline, such as to static textures, vertex buffers, constant buffers, or any other static input buffers to the GPU, as described above with respect to FIG. 16 and FIGS. 17A-17B.

FIG. 18B is a flow diagram for a general case of combining lossy and lossless compression, according to an embodiment. As shown at 1822, compression logic 1820 can read a compression map indicating a per-tile compression profile for a render target. The compression logic 1820 can then compress each tile within a render target based on the compression profile associated with the tile. The compression profile can determine the series of compression algorithms that are applied to the tile to attempt to compress the color data of the tile to maximize compression ratio or whether the tile should be compressed to maximize image quality. For example, a 'prefer lossless' profile can be applied which prefers the use of lossless compression algorithms to prevent any loss of image quality, even if a lower compression ratio is achieved. Other profiles can be applied which will apply lossy compression algorithms to achieve a higher compression ratio at the expense of some image quality, although in one embodiment a high quality, error constrained lossy compression algorithm may be applied to minimize loss of image quality before more aggressive compression techniques or lower compression ratio targets are attempted.

For example, as shown at 1824, the compression logic 1820 can determine a compression profile for a first tile of pixels. The compression profile may indicate to preserve image quality over compression ratio, such as a 'prefer lossless' profile. The 'prefer lossless' profile can attempt lower compression ratio lossless compression should higher compression ratio lossless compression fail, in contrast with attempting a higher compression ratio using lossy compression. At 1825 the compression logic can determine if, for example, a 'prefer lossless' profile is in place for the first tile of pixels. If such profile is not in place, for example, if the first tile has a 'preserve bandwidth' profile in place, the compression logic 1820 can apply a first compression profile to the first tile at 1826. The first compression profile is configured to prioritize compression ratio, for example, by applying higher compression ratio lossy algorithms if the data cannot be compressed via higher compression ratio lossless algorithms, in an order consistent with Table 1 above. The compression logic 1820 can then store the first tile in a compressed format consistent with the first compression profile at 1830.

If the compression logic 1820 determined at 1825 that a compression profile such as the 'prefer lossless' profile is in place, the compression logic can apply a second compression profile to the first tile at 1828. The second compression profile is configured to prioritize image quality, for example, by applying lower compression ratio lossless algorithms if the data cannot be compressed via higher compression ratio lossless algorithms, in an order consistent with Table 2 above. The compression logic 1820 can then store the first tile in a compressed format consistent with the second compression profile at 1832.

Storing the first tile in a compressed format consistent with the respective compression profiles can include storing the first tile at a resulting compression ratio consistent with the profile, such as a higher compression ratio lossy format or a lower compression ratio lossless format. Additionally, compression metadata for each tile can be updated to track the resulting compression ratio and format for each tile.

Based on the compressibility of the data, applying different compression profiles to different data may result in the resulting data being compressed in a similar format. For example and in one embodiment, each profile can indicate to the compression logic 1820 to evaluate a given tile for compression at higher compression ratio lossless compression. If the tile is losslessly compressible at a high compression ratio, the resulting data will be losslessly compressed at the high compression ratio. If the tile cannot be losslessly compressed at the high compression ratio, the tile can be compressed using fallback compression, which is higher compression ratio lossy compression in the case of the first profile or lower compression ratio lossless compression in the case of the second profile. If the fallback compression cannot be performed, for example, due to exceeding error limits for high quality lossy compression or incompressibility of the data using lossless algorithms at a lower compression ratio, additional fallback compression techniques can be applied consistent with Table 1 and Table 2 above, depending on the profile associated with the tile.

Using these techniques, lossy and lossless compression can be performed on a tile-by-tile basis on a render target to adaptively preserve image quality or bandwidth based on the image quality requirements for each tile.

Cache Footprint Reduction Using Guaranteed Rate Compression

In some embodiments, the compression techniques described herein can be applied to cache management policies to implement cache footprint reduction via guaranteed rate compression. The cache hierarchy in a computer system, for both CPUs and GPUs, is essential for maintaining high performance and, in some circumstances, reducing the power consumption associated with various off chip memories. In general, larger capacity caches result in higher performance capabilities for a processor. However, embodiments described herein leverage guaranteed rate compression techniques to improve cache efficiency without increasing the physical memory capacity of a cache. Such techniques can be applied to any cache memory described herein, including but not limited to render target caches, depth buffer caches, sampler caches, GPU L2, L3, or L4 caches, or any other cache memory configured to store GPU data, including caches shared with a CPU.

In one embodiment, an API can provide commands to tag certain surfaces to always be compressed using fixed-rate compression. The fixed-rate compression can be performed to a specific target compression ratio, such as, but not limited to a 2:1 compression ratio. At a 2:1 compression ratio, twice the amount of data can be stored in a cache memory, and enables fewer translation lookaside buffer (TLB) translations for the compressed memory.

The target compression ratio can be reached using a combination of lossless and lossy compression, such as a lossless delta compression and/or lossy fixed-rate compression. In the case of lossy compression, a lossy fixed-rate compression algorithm can be used in which color data is compressed using adaptive quantization across each color channel of the color data. For example, color data may be represented using a red green blue alpha (RGBA) color value with four sub-values corresponding to each of the four color channels (R, G, B, and A). Color data may also be represented using alternate color space representations, such, for example, as a pseudo luminance/intensity orange chrominance green chrominance alpha (YCoCgA) color space such that the color values have sub-values corresponding to the four color channels Y, Co, Cg, and A.

A bounding box may be determined for the color sub-values such that the bounding box comprises one or more bounding ranges for the one or more color channels. The bounding box may include any number of bounding ranges such as, for example, one bounding range for each color channel. In some examples, each bounding range may correspond to a range of values from a minimum sub-value for the color channel to a maximum sub-value for the color channel. In some examples, the bounding ranges may be quantized to generate sets of available values. For example, depending on a size (e.g., a "width") of the bounding range, a number of available values within the range may be determined. In some examples, the number of available values may be a factor of 2, such that available values may be encoded. If a bounding range only has one value, for example, no quantization is needed. In other examples, 2, 4, 8, 16, or 32, or the like number of available values may be made available depending on bandwidth constraints as is discussed further herein.

In some examples, a bounding range may be fully describable using the quantization. For example, if the range includes eight values, eight available values may fully describe the bounding range. However, often, the number of available values will be less than the width of the bounding range and subsequent encoding of the color sub-values may be a lossy encoding, such that some of the precision of the width data is lost. In some examples, the width may be set at an actual width of the bounding range. In some examples, the number of available values may be no greater than a limit such as 32 or the like.

In some examples, the available values of the quantized bounding range may be associated with index values. In some examples, k-bit index values may be needed to be associated with a quantized bounding ranges quantized with $2^k$ index values. For example, 8 index values may be encoded with 3-bit index values, 16 index values may be encoded with 4-bit index values, and so on. In some examples, the color sub-values may be encoded by associating the color sub-value with an index value corresponding to an available value closest to the actual color sub-value. Such encoding may be performed for some or all of the color channels to generate encoded index values that encode the sub-values. In some examples, graphics data including the encoded index values and data associated with the bounding box (e.g., data to describe the bounding range(s) of the bounding box) may be stored in memory. In one embodiment, color data may be mapped between differing color spaces to enhance the compressibility of the data.

In one embodiment, surfaces can be marked such that the marked surfaces are always stored in compressed form at the target compression ratio. As marked surfaces are always stored in compressed form, those surfaces take up a smaller amount of cache. Furthermore, as the surfaces have a fixed compression rate, cache optimizations can be performed for storing compressed data.

Figure 19:
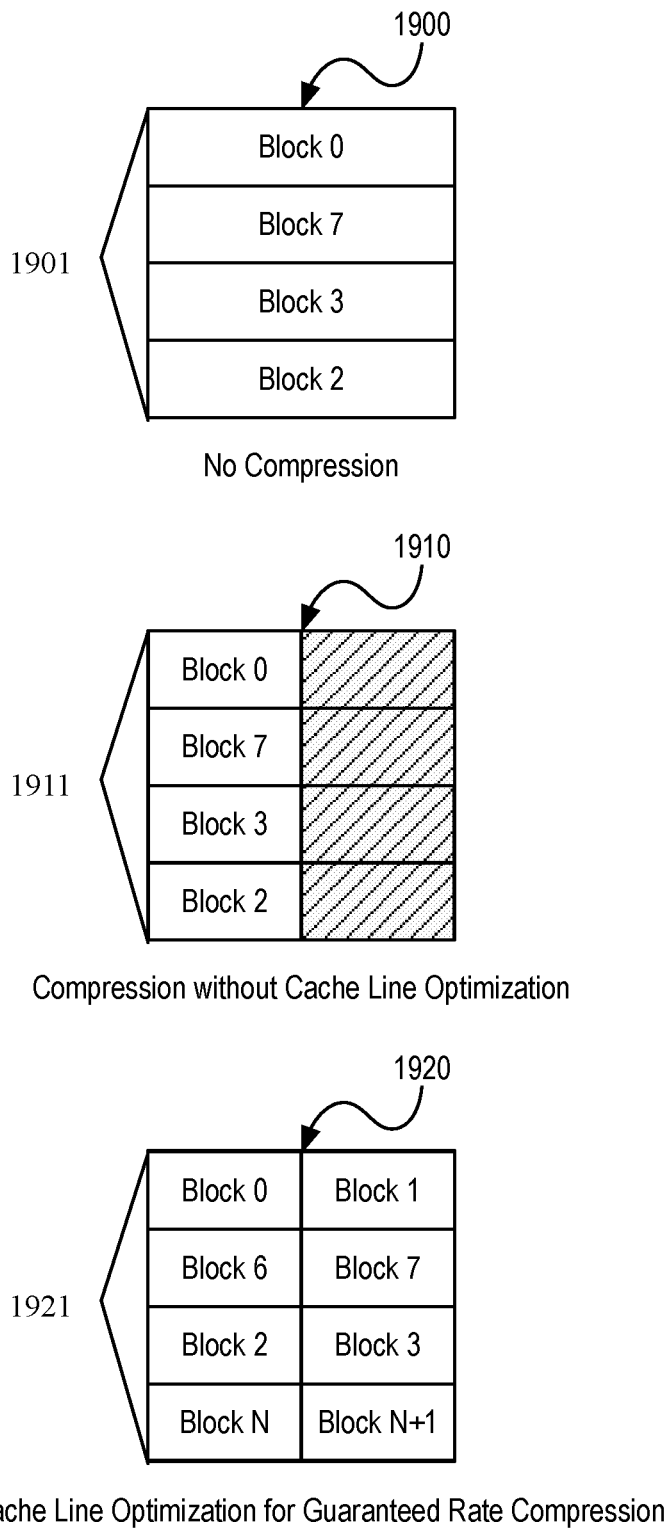
FIG. 19 is a block diagram of cache footprint reduction using guaranteed rate compression, according to an embodiment.

FIG. 19 is a block diagram of cache footprint reduction using guaranteed rate compression, according to an embodiment. A first cache memory 1900 is shown in which four blocks of color data (Block 0, Block 7, Block 3, and Block 2) are stored in a first set of four cache lines 1901. Each block can represent a block of pixel data, such as an N×M tile of pixel data. When the pixel data blocks are stored without compression, each block can occupy an entire cache line.

A second cache memory 1910 is also shown, in which the four blocks of pixel data stored in the first cache 1900 are compressed to a fixed 2:1 compression ratio and stored in a second set of four cache lines 1911. While the compressed blocks consumes a smaller amount of bus bandwidth during transmission and have a smaller memory footprint, some amount of the cache memory (e.g., 50% at a fixed 2:1 compression ratio) goes unused. In existing implementations in which color data is stored in cache and/or memory in a compressed format, a combination of compressed and uncompressed data may be stored in the cache, or compressed data may be stored at variable compression ratios. However, in embodiments in which guaranteed rate compression is used, advanced knowledge of the compression ratio enables cache optimizations as illustrated in the third cache memory 1920.

The third cache memory 1920 includes a cache line optimization for guaranteed rate compression. The third cache memory 1920 is optimized for a 2:1 compression ratio, although other compression ratios may be used. In one embodiment, fixed-rate lossless compression, e.g., with a fixed 2:1 compression ratio, may be used to a given tile or surface. Where necessary, render targets and other color buffers may be compressed with using an adaptive quantization lossy compression algorithm without significant loss in visual quality. Whether lossy or lossless compression is used, the storage efficiency of the cache lines 1921 of the third cache memory 1920 can be increased in direct relation to the compression ratio used by the guaranteed rate compression. For example, with a fixed 2:1 compression ratio, cache control logic can partition a cache line according to the fixed compression ratio and store multiple adjacent blocks of memory associated with a render target in each cache line.

In one embodiment, where multiple adjacent blocks of virtually addressed memory are stored per cache line, a reduction in the number of TLB translations may be realized. As shown in the third cache 1920, data blocks may be stored in a (Block N, Block N+1) configuration per cache line. In such configuration, where Block N has a first virtual memory address and covers a first virtual memory address range, Block N+1 can be associated with the next contiguous virtual memory address and virtual memory address range. In such configuration, a single TLB lookup can be performed for Block N and Block N+1. In one embodiment the third cache 1920 can be configured such that a cache line begins on an even block of data, such that Block N is an even numbered block and Block N+1 is an odd numbered block, which may simplify the hardware implementation of the third cache memory 1920.

When data stored in the third cache 1920 is evicted to graphics or system memory or a cache without support for guaranteed rate compression, the blocks of memory can be decompressed upon eviction. In one embodiment, a single cache line read can be performed to gather the multiple blocks of data within the cache line and the multiple blocks of data can be decompressed before being written to the higher level of cache or memory.

Context Sensitive Cache Replacement

In some embodiments, enabling a context sensitive cache replacement policy for graphics processor cache memories can allow additional improvements in cache memory performance, particularly where data compression is in use. In conventional cache memories, the cache replacement policy may be based upon one or more variants of least recently used (LRU), least recently addressed/accessed (LRA), pseudo-LRU (e.g., tree-PLRU, bit-PLRU), or other cache replacement policies or algorithms known in the art. For example, a least recently addressed policy can age a cache line based on memory accesses associated with the data stored in the cache line. A least recently accessed or least recently used policy can age cache line data based on the number and/or frequency of accesses (e.g., reads, writes, etc.) to the data. Pseudo-LRU algorithms can be one of a tree-based PLRU algorithm or a one-bit PLRU algorithm. While the precise replacement policy applied to different cache memories may vary, in a convention cache memory the same replacement policy is uniformly applied without regard to the stored data.

In some embodiments, context sensitive cache replacement may be enabled, such that the precise cache replacement policy can vary based on the type of cache and/or the type of cache line allocated. For example, different cache replacement policies can be enabled for different cache memories based on cache characteristics, such as whether the cache supports byte masked writes and based on the type of allocation associated with the cache line (e.g., Read/Write, Read Only, Write Only, etc.).

In one embodiment, a context sensitive cache replacement policy can be implemented in which, in addition to the use of a least recently addressed or leased recently used cache replacement policy, the cache replacement policy is configured to favor the eviction of cache lines containing a larger number of dirty pixel blocks. Evicting cache lines with a larger number of dirty pixel blocks can reduce the overhead associated with partial cache line evictions. Partial cache line evictions may introduce merge overhead when evicting pixel blocks from a cache that includes byte masks to a cache or memory controlled by a cache controller or memory controller that does not include byte masks. Byte masks enable masked writes to memory, in which only bits that are lit (e.g., selected) by the byte mask are written, while unlit bits are not written. In memory architectures that do not carry byte-masks throughout the entire memory hierarchy, partial cache line evictions may require a read of the portion of evicted data stored in the higher level of the memory hierarchy, a merge of the read data with the evicted data, and a write-back of the merged data. Furthermore, when data is stored in the cache in a compressed format, a partial cache line eviction can cause the data to be decompressed before being merged, then potentially re-compressed after the merged, introducing additional overhead to partial cache line eviction.

In one embodiment, for write-only (WO) cache line allocations, a dirty bit per pixel block is added, with multiple pixel blocks per cache line. The pixel block can be any grouping of pixels, including a tile of pixels, such as an N×M tile of pixels of a screen space pipeline. For WO cache line allocations, the cache line replacement policy is configured to avoid writing back partially filled lines, which involves writing out of cache lines to memory without all of the bytes of the cache line enabled. When preferring the highest number of dirty blocks there is a higher chance that cache lines that are evicted will be fully lit (e.g., all bytes are enabled). In one embodiment, instead of a dirty bit per pixel block, a count of dirty blocks within a cache line is maintained. The eviction policy can then select a set of cache lines that are the oldest and/or least recently used, accessed, or addressed, then evict the cache line in that set having the largest number of dirty pixel blocks.

In one embodiment, WO cache line allocations differ from read/write (WR) cache line allocations in that the byte masks for WR allocations are all lit by guarantee. Thus if a WR cache line is modified, all blocks are marked as dirty and the entire cache line will be evicted.

Figure 20:
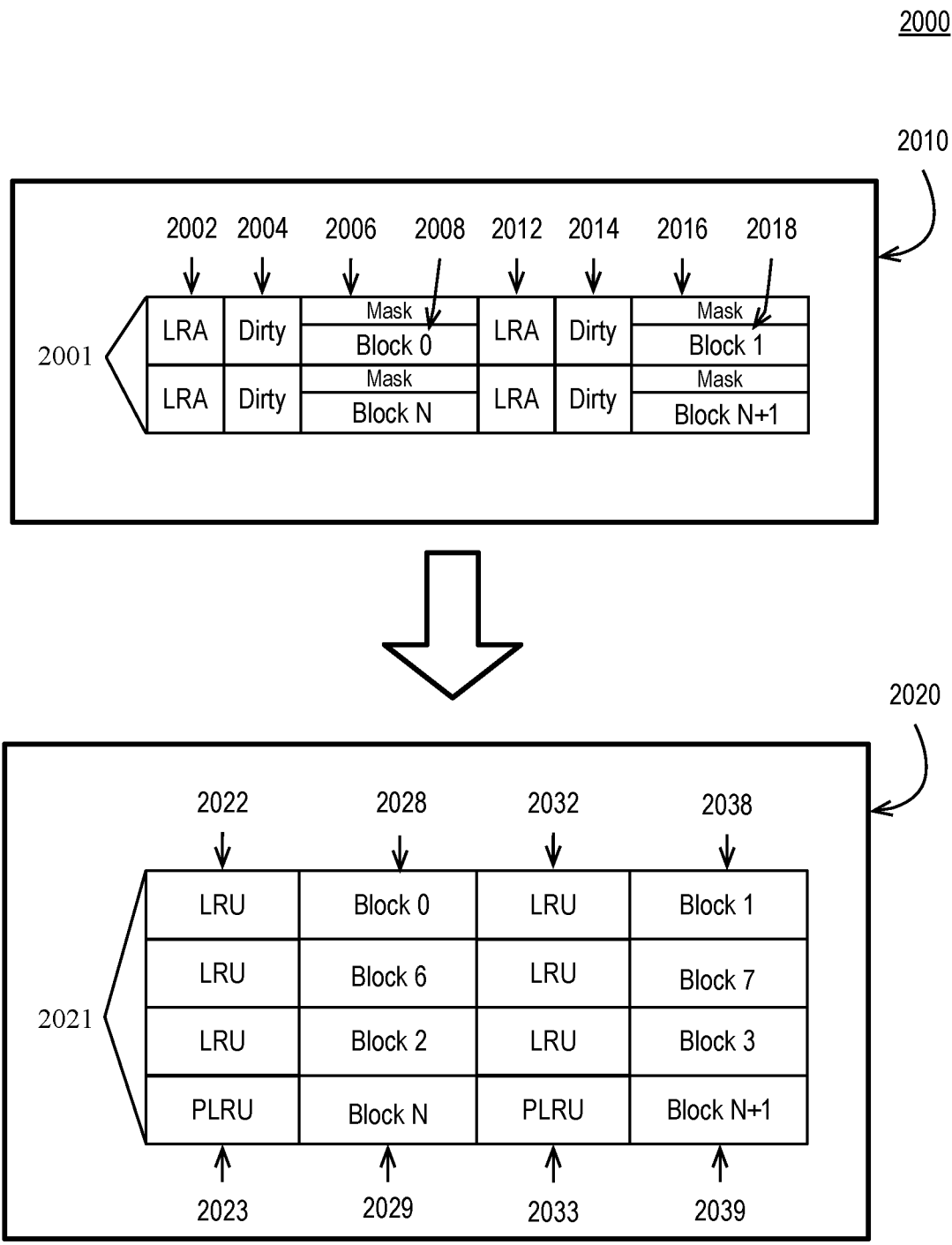
FIG. 20 is a block diagram of an exemplary cache hierarchy in which context sensitive cache replacement is enabled.

FIG. 20 is a block diagram of an exemplary cache hierarchy 2000 in which context sensitive cache replacement is enabled. In one embodiment a first cache memory 2010 includes multiple cache lines 2001, with each cache line storing multiple pixel blocks (e.g., block 2008 (Block 0), block 2018 (Block 1)). A write mask can be used for each block, with mask 2006 associated with block 2008 and mask 2016 associated with block 2018. Each of the multiple cache lines 2001 can include least recently addressed (LRA) metadata (e.g., LRA 2002 for block 2008, LRA 2012 for block 2018) as well as dirty bit for each block of memory (e.g., dirty bit 2004 for block 2008, dirty bit 2014 for block 2018). Evictions from the first cache memory 2010 may be stored in a second cache memory 2020, which lacks the write mask associated with each block. The second cache memory 2020 includes multiple cache lines 2021 that can contain a superset of the data in the first cache memory 2010, including block 2008 (as block 2028) and block 2018 (as block 2038).

In one embodiment the byte masks enable specific writes to specific bits in a pixel block to be tracked for Write Only allocations. In one use case the byte masks enable different compute units (e.g., execution units, streaming multiprocessors, etc.) of a graphics processor to write to adjacent bytes in a buffer. Different instances of the data in differing L1 caches may have differently lit bits due to different write masks. Upon eviction from the L1 caches, the different data can be merged if the higher-level cache does not include byte masks. However, due to the overhead that may be associated with such merge operations, the context sensitive cache replacement algorithm can prefer to evict least recently addressed cache lines with the most dirty pixel blocks. Furthermore, cache line merges may require the de-compression and re-compression of data is the cached data is stored in a compressed format.

In one embodiment, context sensitive cache replacement is configured for the second cache memory by selecting different cache replacement algorithms based on the type of allocation (e.g., Write Only, Read/Write, Read Only) and/or the type of buffer associated with the allocation (e.g., color buffer, depth buffer, etc.). For example, the cache line including block 2028 and block 2038 of the second cache memory 2020 may be allocated Read/Write and a least recently used (LRU) algorithm can be used to manage cache line replacement. Thus, L R U 2022 metadata is stored for block 2028 and LRU 2032 metadata is stored for block 2038. Alternatively, the cache line containing block 2029 (Block N) and block 2039 (Block N+1) may be allocated as Write Only and use a different cache replacement algorithm, such as a pseudo LRU (PLRU) algorithm. In such case PLRU 2023 metadata can be stored for block 2029 and PLRU 2033 metadata can be stored for block 2039.

Figure 21:
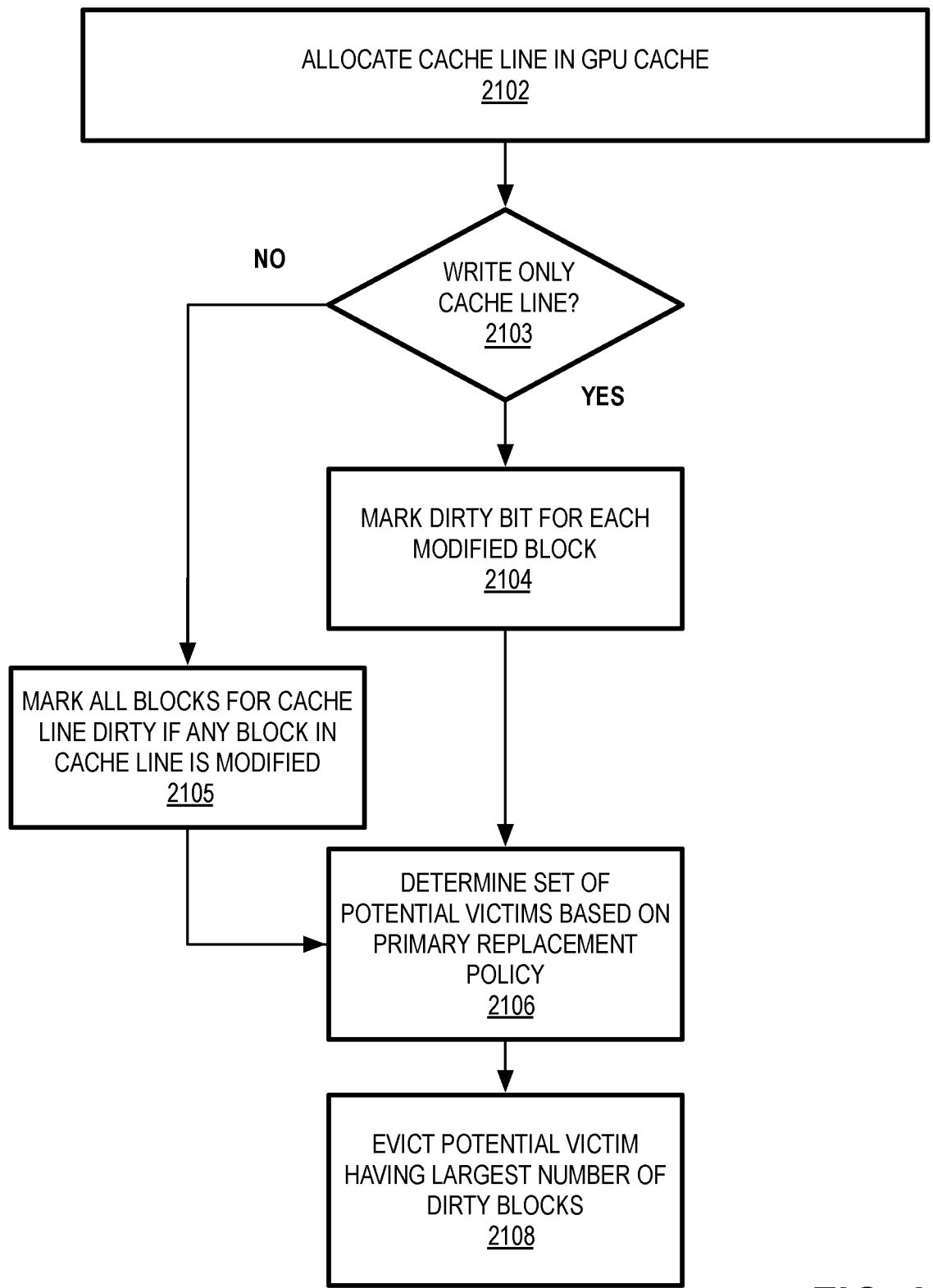
FIG. 21 is a flow diagram of context sensitive cache replacement logic, according to an embodiment.

FIG. 21 is a flow diagram of context sensitive cache replacement logic 2100, according to an embodiment. The context sensitive cache replacement logic 2100 can reside with a cache controller, such as the cache controller 1523 of FIG. 15. The context sensitive cache replacement logic 2100 can be used for managing cache replacement for a cache that maintains byte masks when evicting to a cache that does not maintain byte masks. In one embodiment the context sensitive cache replacement logic 2100 is configured to perform operations including allocating a cache line in a GPU cache, as shown at 2102. The context sensitive cache replacement logic 2100 can determine, at block 2103, whether the cache line allocation is a Write Only cache line. For a Write Only cache line, dirty bits are maintained on a per-block basis for the multiple pixel blocks that are stored for each cache line, based on the byte mask associated with the write, such that when pixel data within a pixel block is written, the context sensitive cache replacement logic 2100 can mark a dirty bit for each modified block, as shown at 2104. For cache lines that are not Write Only, such as a Read/Write cache line, all bits in the write mask are lit by default. In one embodiment, for a Read/Write cache line, the context sensitive cache replacement logic 2100 can mark all pixel blocks in a cache line as dirty if any of the pixel blocks are written to the cache line, as shown at 2105.

When it becomes necessary to replace a cache line, the context sensitive cache replacement logic 2100 can determine a set of potential victims for eviction based on a primary eviction policy, as shown at 2106. The primary eviction policy can be any one of a least recently accessed, least recently addressed, least recently used, pseudo least recently used, or any other cache replacement algorithm or policy. From the set of potential victims, the context sensitive cache replacement logic 2100 can evict the potential victim having the largest number of dirty blocks, as shown at 2108.

The context sensitive cache replacement logic 2100 is exemplary of one embodiment and embodiments may vary in the modifications made to a cache replacement policy and the characteristics by which that determination is made. For example, in cache memories that do not maintain write masks, the specific cache replacement policy used for a cache line can vary based on the allocation type of the cache line or the underlying buffer type (e.g., color, depth, stencil, etc.) for which data is cached.

Efficient Delta Encoding

In the embodiments described herein, lossless color compression logic is used, in some instances, to reduce the transmission bandwidth requirements for color data. Such logic can also be leveraged for use in compressing read only data for input into a graphics pipeline. For color buffer compression to be useful, the compression algorithm should be able to successfully compress color data for a tile of pixels to some threshold compression ratio. For example, for a target compression ratio of 2:1, a tile that uses 1024 bits in uncompressed form will be reduced to 512 bits of the target compression ratio is to be achieved. The more tiles that can be compressed to the target compression ratio, the less bandwidth is consumed on a memory bus to transmit the data. As described herein multiple different thresholds and target compression ratios may be in place for a given color buffer compression system (e.g., compressing from 2048 bits to multiples of 512 bits: 1536 bits, or 1024 bits, or 512 bits).

A typical color buffer compression algorithm may find the minimum color components in the tile, and then use as few bits as possible to encode the residuals relative to the minimum color component per channel. Those schemes are sometimes called offset compression methods. Offset compression method may be used in scenarios in which the graphics API (e.g., OpenGL, DirectX, etc.) require that any color buffer compression be performed losslessly. However, offset compression methods are not efficient if a tile contains two or more distinct groups of colors, such as a group of bluish colors and another group of yellowish colors.

To improve upon existing lossless color compression methods, embodiments described herein provide lossless color compression logic in which the colors of a tile are partitioned into distinct groups, such that the variation of color within each group is lowered. These partitioned groups can then be efficiently encoded. For each color group, a minimum color is identified for a bounding box defined within RGB color space. The bounding box is defined within a color space using color data; much in the way a screen-space bounding box can be defined using screen space coordinates. The minimum color within the bounding box can then be subtracted from all colors in the group to calculate a residual component for each color channel. The largest color component, $L_R$, $L_G$, $L_B$, of the residuals of each channel is then found. The "widths" of each channel are denoted as $W_R$, $W_G$, $W_B$, where $W_R=L_R+1$; $W_G=L_G+1$; and $W_B=L_B+1$.

While the description below is described in terms of a three-channel RGB color space, the techniques described herein may be generalized to any number of color channels in any color space, such as a four channel RGBA.

In compression algorithms known in the art, an integer number of bits are generally used to store the residual value per color channel. For example, for the red channel, R, the smallest k is determined such that $W_R<=2^k$. Each residual for R can then be encoded with k bits. However, this technique can become very wasteful under certain circumstances. For example, if the largest residual is 32, then six bits are needed to encode the residual value, as five bits allows a maximum value of $2^5-1=31$.

Instead, a more efficient coding technique may be used in which the color data is transformed into a single integer cost. For a given color residual values r, g, b in which the minimum color has been subtracted as described above, r is a number between zero and $W_R-1$, g is a number between zero and $W_G-1$ and, and b is a number between zero and $W_B-1$. In this example, the encoding can be transformed into a single integer cost T, as follows:

$$T = r + g*W_R + b*W_R*W_G \qquad \text{[Equation 1]}$$

The resulting number T is at most be between 0 and $(W_R*W_G*W_B-1)$. Thus, the smallest number k is found such that $(W_R*W_G*W_B-1)<2^k$ and each T is encoded with k bits. This encoding can result in a savings in the number of bits for each group of encoded values. Furthermore, this concept may be extended to four values (e.g., RGBA) or to any number of values. In addition, it may be more efficient to encode four red values of a tile instead. Decoding the encoded value can be performed as indicated in Equation 2 below.

$$b = T/(W_R*W_G)$$

$$g = (T - b*W_R*W_G)/W_R = (T \% (W_R*W_G))/W_R$$

$$r = (T - b*W_R*W_G) \% \ W_R = (T \% (W_R*W_G)) \% \ W_R \qquad \text{[Equation 2]}$$

Embodiments described herein improve the delta encoding technique described above by further reducing the number of bits required to store the encoded color values. Specifically implementing the technique described above requires storing the size of the widths of the color channels. The width of a channel can be any number from 0 to $2^m-1$, where m is the number of total bits for uncompressed colors. The most common values of m are 8, 16, and 32. To implement the compression technique in hardware, the hardware logic will be required to perform multiply and divide operations with any number from 2 to $2^m$. However, the complexity of the logic can be reduced, as not all values between 2 to $2^m$ are required. For example, the bit savings resulting from encoding 4 values is shown in Table 3 below.

TABLE 3

| | | Bits Saved via Single Integer Delta Encoding | | |
|---|---|---|---|---|
| [1 max] | [2 base] | Compact num bits: 4 | Sparse num bits: 4 | diff: 0 |
| [2 max] | [3 base] | Compact num bits: 7 | Sparse num bits: 8 | diff: 1 |
| [3 max] | [4 base] | Compact num bits: 8 | Sparse num bits: 8 | diff: 0 |
| [4 max] | [5 base] | Compact num bits: 10 | Sparse num bits: 12 | diff: 2 |
| [5 max] | [6 base] | Compact num bits: 11 | Sparse num bits: 12 | diff: 1 |
| [6 max] | [7 base] | Compact num bits: 12 | Sparse num bits: 12 | diff: 0 |
| [7 max] | [8 base] | Compact num bits: 12 | Sparse num bits: 12 | diff: 0 |
| [8 max] | [9 base] | Compact num bits: 13 | Sparse num bits: 16 | diff: 3 |
| [9 max] | [10 base] | Compact num bits: 14 | Sparse num bits: 16 | diff: 2 |
| [10 max] | [11 base] | Compact num bits: 14 | Sparse num bits: 16 | diff: 2 |
| [11 max] | [12 base] | Compact num bits: 15 | Sparse num bits: 16 | diff: 1 |
| [12 max] | [13 base] | Compact num bits: 15 | Sparse num bits: 16 | diff: 1 |
| [13 max] | [14 base] | Compact num bits: 16 | Sparse num bits: 16 | diff: 0 |
| [14 max] | [15 base] | Compact num bits: 16 | Sparse num bits: 16 | diff: 0 |
| [15 max] | [16 base] | Compact num bits: 16 | Sparse num bits: 16 | diff: 0 |
| [16 max] | [17 base] | Compact num bits: 17 | Sparse num bits: 20 | diff: 3 |
| [17 max] | [18 base] | Compact num bits: 17 | Sparse num bits: 20 | diff: 3 |
| [18 max] | [19 base] | Compact num bits: 17 | Sparse num bits: 20 | diff: 3 |
| [19 max] | [20 base] | Compact num bits: 18 | Sparse num bits: 20 | diff: 2 |
| [20 max] | [21 base] | Compact num bits: 18 | Sparse num bits: 20 | diff: 2 |
| [21 max] | [22 base] | Compact num bits: 18 | Sparse num bits: 20 | diff: 2 |
| [22 max] | [23 base] | Compact num bits: 19 | Sparse num bits: 20 | diff: 1 |
| [23 max] | [24 base] | Compact num bits: 19 | Sparse num bits: 20 | diff: 1 |
| [24 max] | [25 base] | Compact num bits: 19 | Sparse num bits: 20 | diff: 1 |
| [25 max] | [26 base] | Compact num bits: 19 | Sparse num bits: 20 | diff: 1 |
| [26 max] | [27 base] | Compact num bits: 20 | Sparse num bits: 20 | diff: 0 |
| [27 max] | [28 base] | Compact num bits: 20 | Sparse num bits: 20 | diff: 0 |
| [28 max] | [29 base] | Compact num bits: 20 | Sparse num bits: 20 | diff: 0 |
| [29 max] | [30 base] | Compact num bits: 20 | Sparse num bits: 20 | diff: 0 |
| [30 max] | [31 base] | Compact num bits: 20 | Sparse num bits: 20 | diff: 0 |
| [31 max] | [32 base] | Compact num bits: 20 | Sparse num bits: 20 | diff: 0 |
| [32 max] | [33 base] | Compact num bits: 21 | Sparse num bits: 24 | diff: 3 |
| [33 max] | [34 base] | Compact num bits: 21 | Sparse num bits: 24 | diff: 3 |
| [34 max] | [35 base] | Compact num bits: 21 | Sparse num bits: 24 | diff: 3 |
| [35 max] | [36 base] | Compact num bits: 21 | Sparse num bits: 24 | diff: 3 |
| [36 max] | [37 base] | Compact num bits: 21 | Sparse num bits: 24 | diff: 3 |
| [37 max] | [38 base] | Compact num bits: 21 | Sparse num bits: 24 | diff: 3 |
| ... | | | | |

The values of Table 3 are as follows. Four values are encoded, where the [x max] indicates that x is the largest residual (L) and [x+1 base] indicates that x+1 is the width that used in the encoding. "Compact num bits: y" indicates the number of bits used to store a compact, single integer delta encoded using Equation 1. "Sparse num bits: z" indicates the number of bits a delta encoded representation of the color data would consume without the use of Equation 1. The diff value indicates the bit savings realized by the use of an encoding represented by Equation 1. For example, "diff: 3" indicates that 3 bits are saved when encoding four values associated with a four channel color values for four channel pixel color data. If three bits are saved for each pixel, using a common tile size of 8×4 pixels results in a savings of 96 bits per tile.

However, it will be noted that not all possible values for a channel width are necessary. The important numbers are those associated with the last in a set of identical "diff" numbers. For example, the row starting with "[25 max]" has a diff value of one, while the diff value of the row beginning with "[26 max]" is zero. As the change in diff bits only occurs at certain numbers (e.g. the bold numbers of Table 3), only those numbers need be used as basis numbers. Thus, in one embodiment, instead of using all numbers from 2 to $2^m$ as basis numbers, only a subset of those numbers is used. Specifically, assuming m=8, the set of basis numbers is reduced from 2 to $2^8$ (e.g., 2 to 256) to the following set of basis values:

[Compact Basis for m=8]
{2, 3, 4, 5, 6, 8, 9, 11, 13, 16, 19, 22, 26, 32, 38, 45, 53, 64, 76, 90, 107, 128, 152, 181, 215, 256}

The compact set of basis values is exploited in multiple ways. First, encoding the data requires storing the size of the basis as weight $W_X$, (e.g., $W_R$, $W_G$, $W_B$) as in Equation 2 above. For m=8, a compact basis includes 26 different values. Instead of m bits per channel, the 26 different values can be stored using five bits by storing the values in an indexed list, saving three bits per channel. Encoding four channel RGBA color data can result in a savings of 12 bits per tile.

Second, as the decode logic will not be required to multiply and divide by all numbers between 2 and $2^m$, the multiply and divide logic can be simplified. For example for m=8, the set of numbers in the compact basis may be factorized as in Table 4 below.

TABLE 4

| Compact Basis Factorization |
|---|
| 2 = 2 |
| 3 = 2 + 1 |
| 4 = 2 * 2 |
| 5 = 2 * 2 + 1 |
| 6 = 2 * (2 + 1) = 2 * 2 + 2 |
| 8 = 2 * 2 * 2 |
| 9 = 2 * 2 * 2 + 1 |
| 11 = 2 * 2 * 2 + 2 + 1 |
| 13 = 2 * 2 * 2 + 2 * 2 + 1 |
| 16 = 2 * 2 * 2 * 2 |
| 19 = 2 * 2 * 2 * 2 + 2 + 1 |
| 22 = 2 * (2 * 2 * 2 + 2 + 1) = 2 * 2 * 2 * 2 + 2 * 2 + 2 |
| 26 = 2 * (2 * 2 * 2 + 2 * 2 + 1) = 2 * 2 * 2 * 2 + 2 * 2 * 2 + 2 |
| 32 = 2 * 2 * 2 * 2 * 2 |

TABLE 4-continued

Compact Basis Factorization

38 = 2 * (2 * 2 * 2 * 2 + 2 + 1) = 2 * 2 * 2 * 2 * 2 + 2 * 2 + 2
45 = (2 * 2 * 2 + 1) * (2 * 2 + 1) =
    2 * 2 * 2 * 2 * 2 + 2 * 2 * 2 + 2 * 2 + 1
53 = 1 + 2 * 2 * (2 * 2 * 2 + 2 * 2 + 1) =
    2 * 2 * 2 * 2 * 2 + 2 * 2 * 2 * 2 + 2 * 2 + 1
64 = 2 * 2 * 2 * 2 * 2 * 2
76 = 2 * 2 * (2 * 2 * 2 * 2 + 2 + 1) =
    2 * 2 * 2 * 2 * 2 * 2 + 2 * 2 * 2 + 2 * 2
90 = 2 * (2 * 2 * 2 + 1) * (2 * 2 + 1) =
    2 * 2 * 2 * 2 * 2 + 2 * 2 * 2 * 2 + 2 * 2 * 2 + 2
107 = 1 + 2 * (1 + 2 * 2 * (2 * 2 * 2 + 2 * 2 + 1) ) =
    2 * 2 * 2 * 2 * 2 * 2 + 2 * 2 * 2 * 2 * 2 + 2 * 2 * 2 + 2 + 1
128 = 2 * 2 * 2 * 2 * 2 * 2 * 2
152 = 2 * 2 * 2 * (2 * 2 * 2 + 2 + 1) =
    2 * 2 * 2 * 2 * 2 * 2 + 2 * 2 * 2 * 2 * 2 + 2 * 2 * 2
181 = 2 * 2 * 2 * 2 * 2 * 2 * 2 + 2 * 2 * 2 * 2 * 2 +
    2 * 2 * 2 * 2 + 2 * 2 + 1
215 = 2 * 2 * 2 * 2 * 2 * 2 * 2 + 2 * 2 * 2 * 2 * 2 * 2 +
    2 * 2 * 2 * 2 + 2 * 2 + 2 + 1
256 = 2 * 2 * 2 * 2 * 2 * 2 * 2 * 2

As indicated in Table 4, each value of the compact basis can be represented as a series of multiplications by two (e.g., shift left) and additions. Thus, the hardware multiplier to implement such encoding can be significantly simplified.

For example, a value x can be multiplied by a basis value 76 using the following operations: x*76=x*(2*2*2*2*2+2*2*2+2*2)=SL(x,6)+SL(x,3)+SL(x,2), which consists of three left shifts and two addition operations. The most complex multiplication operation for the set of compact basis values for m=8 is the value 215. A multiplication by 215 can be performed using the following operations: x*215=x*(2*2*2*2*2*2*2+2*2*2*2*2*2+2*2*2*2+2*2+2+1)=SL(x,7)+SL(x,6)+SL(x,4)+SL(x,2)+SL(x,1)+x. Thus, for m=8, significantly simplified multiplier logic for use in color delta compression hardware can be substituted for generalized multiplier logic that is capable of multiplying by any number between 2 and $2^m$.

Figure 22:
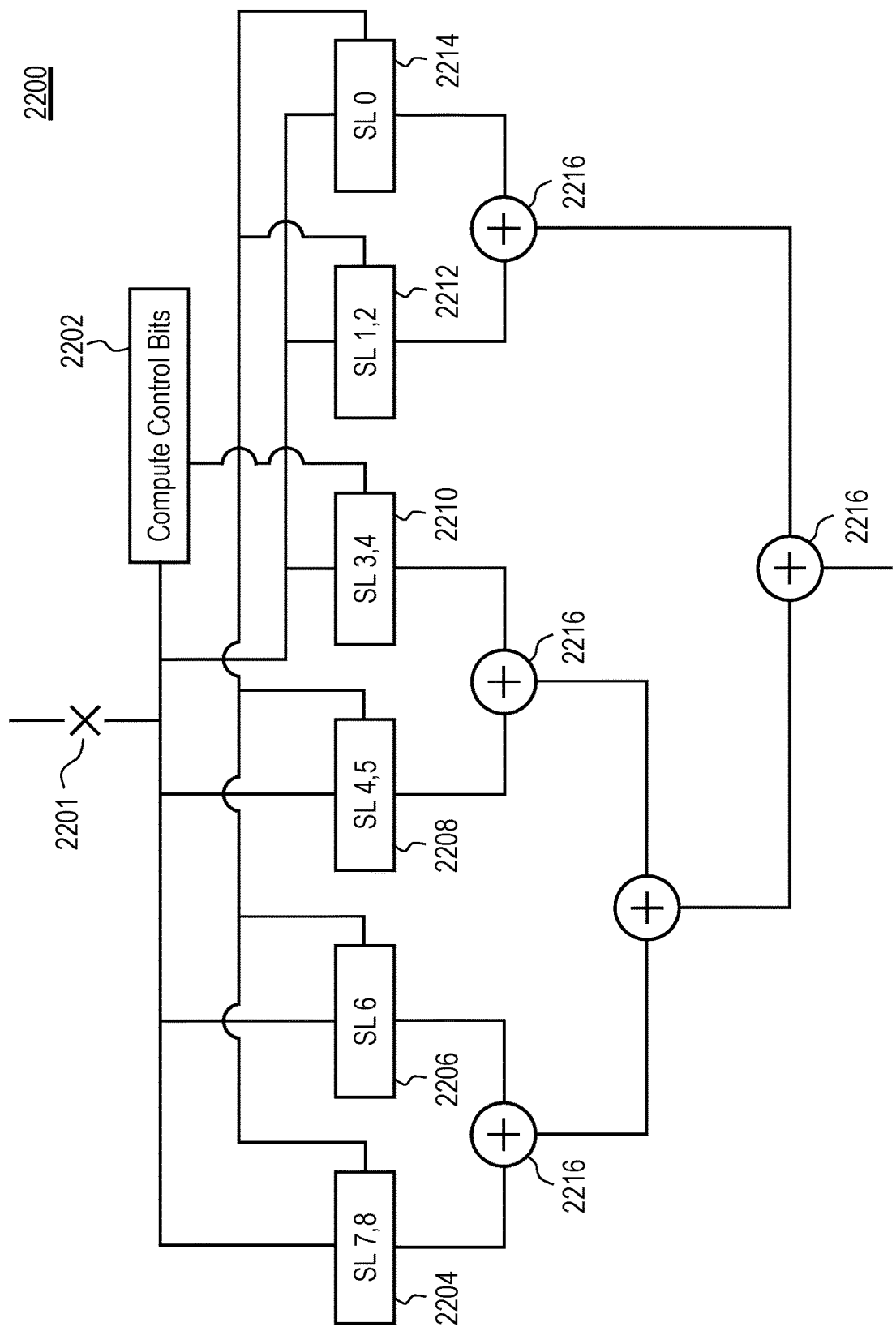
FIG. 22 is a block diagram of a hardware multiplier unit for use in efficient delta encoding, according to an embodiment.

FIG. 22 is a block diagram of a hardware multiplier unit 2200 for use in efficient delta encoding, according to an embodiment. In one embodiment the hardware multiplier unit 2200 includes an input 2201 to receive a multiplier value and compute control bits logic 2202 to compute a set of control bits to configure the shift logic used to perform the multiplication. The shift logic can be configured to left shift an input value based on a selection of one of one or more possible shifts. The illustrated hardware multiplier unit 2200 includes an [SL7,8] unit 2204, an [SL6] unit 2205, an [SL4,5] unit 2208, an [SL3,4] unit 2210 an [SL1,2] unit 2212, and an [SL0] unit 2214. The shift logic is coupled via multiple adders 2216. Each shift unit is pre-configured with one or two shift values that can be selected via control bits. In one embodiment, a control bit of 0b01 (e.g., one) shifts input by the first pre-configured value, while a control bit of 0b10 (e.g., two) shifts input by the second pre-configured value. A control bit of 0b00 (e.g., zero) causes the shift unit to output a zero value. For example, a control bit value of one input to the [SL7,8] unit 2204 causes a left shift of the input by 7, while a control bit value of two input to the [SL7,8] unit 2204 causes a left shift of the input by 8. A control bit value of zero causes a zero value to be output. Thus, to perform a multiplication by a value of 215, the compute control bits logic 2202 would output control bits to shift the input by 7, 6, 4, 2, 1, 0. To multiply by 76, the compute control bits logic would output 0b00 to [SL7,8] unit 2204 (which outputs zero), 0b01 to [SL6] unit 2206, which shifts left by 6, 0b00 to [SL4,5] unit 2208, which outputs zero, 0b01 to [SL3,4] unit 2210 which shifts left by three, 0b10 to [SL1,2] unit 2212 which shifts left by two, and 0b00 [SL0] unit 2214, which outputs zero. The specific control bits to output for each input value can be stored in a hardware lookup table.

Figure 23:
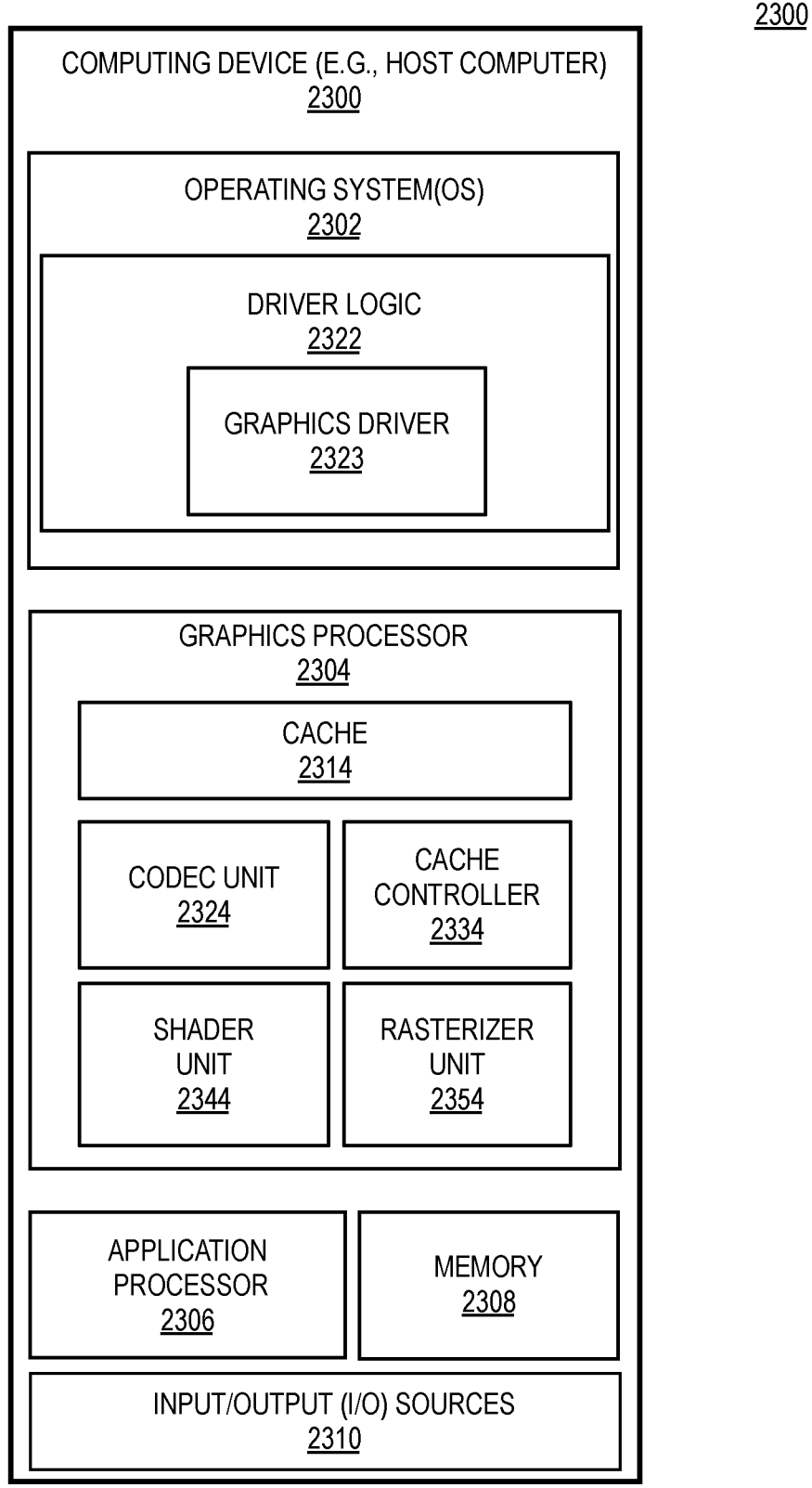
FIG. 23 is a block diagram of a graphics system according to an embodiment.

FIG. 23 is a block diagram of a computing device 2300 including a graphics processor 2304, according to an embodiment. The computing device 2300 can be a computing device such as the data processing system 100 as in of FIG. 1. The computing device 2300 may also be or be included within a communication device such as a set-top box (e.g., Internet-based cable television set-top boxes, etc.), global positioning system (GPS)-based devices, etc. The computing device 2300 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2300 includes a mobile computing device employing an integrated circuit ("IC"), such as system on a chip ("SoC" or "SOC"), integrating various hardware and/or software components of computing device 2300 on a single chip.

The computing device 2300 includes a graphics processor 2304. The graphics processor 2304 represents any graphics processor described herein. The graphics processor includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics and image resources.

In one embodiment the graphics processor 2304 includes a cache 2314, which can be a single cache or divided into multiple segments of cache memory, including but not limited to any number of L1, L2, L3, or L4 caches, render caches, depth caches, sampler caches, and/or shader unit caches. In one embodiment, the graphics processor 2304 includes a codec unit 2324, a cache controller 2334, a shader unit 2344, and a rasterizer unit 2354. The codec unit 2324 can implement multiple forms of compression and decompression logic as described herein, including performing lossy and lossless compression at guaranteed and/or variable compression rates. In one embodiment the codec unit 2324 can be configured to encode and decode losslessly compressed data using the efficient delta encoding techniques and simplified hardware logic associated with FIG. 22. The cache controller 2334 can configure and control the use of the various cache management and replacement techniques described herein, including context sensitive cache replacement and cache footprint reduction using guaranteed rate compression. The shader unit 2344 can process and execute vertex, geometry, tessellation, fragment, or pixel shaders programs for a programmable graphics and media pipeline. The rasterizer unit 2354 includes configurable fixed function to perform triangle rasterization, to transform a scene from an object space to a screen space, and can work in concert with the shader unit 2344 to perform hybrid rasterization using shader based ray-tracing techniques.

As illustrated, in one embodiment, and in addition to the graphics processor 2304, the computing device 2300 may further include any number and type of hardware components and/or software components, including, but not limited to an application processor 2306, memory 2308, and input/output (I/O) sources 2310. The application processor 2306 can interact with a hardware graphics pipeline, as illustrated with reference to FIG. 3, to share graphics pipeline functionality. Processed data is stored in a buffer in the hardware graphics pipeline and state information is stored in memory 2308. The resulting data can be transferred to a display controller for output via a display device, such as the display device 323 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 2306 can include one or processors, such as processor(s) 102 of FIG. 1, and may be the central processing unit (CPU) that is used at least in part to execute an operating system (OS) 2302 for the computing device 2300. The OS 2302 can serve as an interface between hardware and/or physical resources of the computer device 2300 and one or more users. The OS 2302 can include driver logic 2322 for various hardware devices in the computing device 2300. The driver logic 2322 can include graphics driver logic 2323 such as the user mode graphics driver 1026 and/or kernel mode graphics driver 1029 of FIG. 10.

It is contemplated that in some embodiments the graphics processor 2304 may exist as part of the application processor 2306 (such as part of a physical CPU package) in which case, at least a portion of the memory 2308 may be shared by the application processor 2306 and graphics processor 2304, although at least a portion of the memory 2308 may be exclusive to the graphics processor 2304, or the graphics processor 2304 may have a separate store of memory. The memory 2308 may comprise a pre-allocated region of a buffer (e.g., framebuffer); however, it should be understood by one of ordinary skill in the art that the embodiments are not so limited, and that any memory accessible to the lower graphics pipeline may be used. The memory 2308 may include various forms of random access memory (RAM) (e.g., SDRAM, SRAM, etc.) comprising an application that makes use of the graphics processor 2304 to render a desktop or 3D graphics scene. A memory controller hub, such as memory controller hub 116 of FIG. 1, may access data in the memory 2308 and forward it to graphics processor 2304 for graphics pipeline processing. The memory 2308 may be made available to other components within the computing device 2300. For example, any data (e.g., input graphics data) received from various I/O sources 2310 of the computing device 2300 can be temporarily queued into memory 2308 prior to their being operated upon by one or more processor(s) (e.g., application processor 2306) in the implementation of a software program or application. Similarly, data that a software program determines should be sent from the computing device 2300 to an outside entity through one of the computing system interfaces, or stored into an internal storage element, is often temporarily queued in memory 2308 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2310 may include one or more I/O devices that are implemented for transferring data to and/or from the computing device 2300 (e.g., a networking adapter); or, for a large-scale non-volatile storage within the computing device 2300 (e.g., hard disk drive). User input devices, including alphanumeric and other keys, may be used to communicate information and command selections to graphics processor 2304. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 2300 may be employed to observe gestures, record audio and video and to receive and transmit visual and audio commands.

I/O sources 2310 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2300 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

Described herein are several embodiments which provide for enhanced data caching in combination with adaptive and dynamic compression to increase the storage efficiency and reduce the transmission bandwidth of data during input and output from a GPU. The techniques described herein can reduce the need to access off-chip memory, resulting in improved performance and reduced power for GPU operations.

One embodiment provides for a graphics processing apparatus comprising a shader engine; one or more cache memories; cache control logic to control at least one of the one or more cache memories; and a codec unit coupled with the one or more cache memories, the codec unit configurable to perform lossless compression of read only surface data upon storage to or eviction from the one or more cache memories.

One embodiment provides for a method comprising configuring a buffer for read only access by a graphics pipeline; providing buffer data to lossless color compression logic associated with a cache memory of the graphics pipeline; attempting lossless compression for a first unit of data from the buffer; storing the first unit of data in a compressed format in response to losslessly compressing the unit of data; and marking metadata associated with the first unit of data to indicate a compression status for the first unit of data.

One embodiment provides for a data processing system comprising a shader engine; a display device to display output generated via the shader engine; one or more cache memories; cache control logic to control at least one of the one or more cache memories; and a codec unit coupled with the one or more cache memories, the codec unit configurable to perform lossless compression of read-only surface data upon storage to or eviction from the one or more cache memories.

One embodiment provides for a graphics processing apparatus comprising a shader engine to generate render target data and a codec unit coupled with the shader engine, the codec unit to compress render target data generated by the shader engine, the render target data to be compressed using lossy or lossless compression based on a profile associated with the render target data.

One embodiment provides for a graphics processing apparatus comprising a shader engine to generate render target data; one or more cache memories to store the render target data; a codec unit coupled with the one or more cache memories, the codec unit to apply guaranteed rate compression to the render target data to reduce the cache footprint associated with the render target data; and cache control logic to control at least one of the one or more cache memories, the cache control logic to exploit the guaranteed rate compression to increase the storage efficiency of the cache in accordance with the compression ratio of the guaranteed rate compression.

One embodiment provides for a graphics processing apparatus comprising a first cache memory to store graphics pipeline data, the first cache memory having a byte mask for masked writes to the first cache memory and a dirty bit for each block of pixel data within a cache line, each cache line including memory to store multiple blocks of pixels; a second cache memory, the second cache to merge partial evictions from the first cache based on the byte mask; a cache controller to manage at least the first cache memory, the cache controller to determine a set of cache lines for potential eviction based on a primary cache replacement policy and evict the cache line having the largest number of dirty blocks.

One embodiment provides for a graphics processing apparatus comprising one or more cache memories and a codec unit coupled to the one or more cache memories. The codec unit can be configured to losslessly compress render target data upon storage to or eviction from the one or more cache memories. To losslessly compress the render target data, the codec unit is to determine, for a tile of pixels within the render target, a minimum value for each color channel, a set of residual values for each color channel, and a width of each color channel, and encode the width of each color channel via a compact set of basis values, the compact set of basis values including fewer than all possible values of the width.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An apparatus comprising:
one or more processors including a graphics processor having:
a shader engine;
one or more cache memories, wherein the one or more cache memories include a first cache memory and a second cache memory, wherein the first cache memory is to receive a first portion of data from a read-only surface;
cache controller to control at least one of the one or more cache memories, wherein the cache controller is further to control cache lines associated with a render cache and a victim cache to manage cache line allocations of data to be stored in one or more of the render cache and the victim cache, wherein the cache controller is further to continuously maintain and provide status information relating to the data and the cache lines; and a codec unit coupled with the one or more cache memories, the codec unit to perform lossless compression of read-only surface data upon storage to or eviction from the one or more cache memories, wherein the codec unit is further to process the first portion of data for compression, and attempt to losslessly compress a first portion of data to a target compression ratio, and attempt to losslessly compress a first portion of data from the read-only surface to a first target compression ratio, and attempt to losslessly compress the first portion of data to a second target compression ratio if the first portion of data is unable to compress the first portion of data to the first target compression ratio, wherein the codec unit is further to mark metadata associated with the first portion of data to indicate a compression status for the first portion of data, wherein the codec unit is further to determine potential victims based on a primary replacement policy, and evict one or more of the potential victims having large numbers of dirty blocks, wherein the dirty blocks represent modified blocks in the cache lines.

2. The apparatus as in claim 1, wherein the codec unit is to process the first portion of data for compression during eviction of the first portion of data to the second cache memory.

3. The apparatus as in claim 1, wherein the codec unit is to compress the first portion of data to a first compression ratio and bypass completion of compression of a second portion of data from the read-only surface if the second portion of data cannot be compressed to the first compression ratio without data loss.

4. The apparatus as in claim 1, wherein the second cache memory of the one or more cache memories is to store a first portion of data at a first compression ratio and a second portion of data at a 1:1 compression ratio.

5. The apparatus as in claim 4, wherein the second target compression ratio is greater than a 1:1 compression ratio and the second cache memory of the one or more cache memories is to store a third portion of data from the read-only surface at the second target compression ratio.

6. The apparatus as in claim 1, wherein the shader engine includes one or more of a vertex processor and a pixel processor.

7. The apparatus as in claim 6, wherein the vertex processor or the pixel processor is to receive uncompressed data from the read-only surface via the codec unit, the codec unit to decompress one or more portions of compressed data from the read-only surface.

8. The apparatus as in claim 1, wherein the read-only surface includes vertex data, texture data, or other constant data to be read by the shader engine.

9. A graphics data processing system comprising:
a shader engine;
a display device to display output generated via the shader engine;
one or more cache memories, wherein the one or more cache memories include a first cache memory and a second cache memory, wherein the first cache memory is to receive a first portion of data from a read-only surface;

cache controller to control at least one of the one or more cache memories, wherein the cache controller is further to control cache lines associated with a render cache and a victim cache to manage cache line allocations of data to be stored in one or more of the render cache and the victim cache, wherein the cache controller is further to continuously maintain and provide status information relating to the data and the cache lines; and a codec unit coupled with the one or more cache memories, the codec unit configurable to perform lossless compression of read-only surface data upon storage to or eviction from the one or more cache memories, wherein the codec unit is further to process the first portion of data for compression, and attempt to losslessly compress a first portion of data to a target compression ratio, attempt to losslessly compress a first portion of data from the read-only surface to a first target compression ratio, and attempt to losslessly compress the first portion of data to a second target compression ratio if the first portion of data is unable to compress the first portion of data to the first target compression ratio, the codec unit is further to mark metadata associated with the first portion of data to indicate a compression status for the first portion of data, wherein the codec unit is further to determine potential victims based on a primary replacement policy, and evict one or more of the potential victims having large numbers of dirty blocks, wherein the dirty blocks represent modified blocks in the cache lines.

10. The graphics data processing system as in claim 9, wherein the codec unit is to process the first portion of data for compression during eviction of the first portion of data to the second cache memory.

11. A method comprising:
receiving, by one or more cache memories, a first portion of data from a read-only surface, wherein the one or more cache memories include a first cache memory and a second cache memory;
controlling, by a cache controller, at least one of the one or more cache memories, and further controlling cache lines associated with a render cache and a victim cache for managing cache line allocations of data to be stored in one or more of the render cache and the victim cache, and maintaining and providing status information relating to the data and the cache lines;
performing, by a codec unit coupled to the one or more cache memories, lossless compression of read-only surface data upon storage to or eviction from the one or more cache memories, wherein the codec unit is further to process the first portion of data for compression, and attempt to losslessly compress a first portion of data to a target compression ratio, and attempt to losslessly compress a first portion of data from the read-only surface to a first target compression ratio, and attempt to losslessly compress the first portion of data to a second target compression ratio if the first portion of data is unable to compress the first portion of data to the first target compression ratio, wherein the codec unit is further to mark metadata associated with the first portion of data to indicate a compression status for the first portion of data; and
determine, by the codec unit, potential victims based on a primary replacement policy, and evict one or more of the potential victims having large numbers of dirty blocks, wherein the dirty blocks represent modified blocks in the cache lines.

12. The method as in claim 11, further comprising processing the first portion of data for compression during eviction of the first portion of data to the second cache memory.

13. The method as in claim 11, further comprising compressing the first portion of data to a first compression ratio and bypass completion of compression of a second portion of data from the read-only surface if the second portion of data cannot be compressed to the first compression ratio without data loss.

14. The method as in claim 11, further comprising storing a first portion of data at a first compression ratio and a second portion of data at a 1:1 compression ratio.

15. The method as in claim 14, wherein the second target compression ratio is greater than a 1:1 compression ratio and the second cache memory of the one or more cache memories is to store a third portion of data from the read-only surface at the second target compression ratio.

16. The method as in claim 11, wherein the shader engine includes one or more of a vertex processor and a pixel processor.

17. The method as in claim 16, further comprising receiving, by the vertex processor or the pixel processor, uncompressed data from the read-only surface via the codec unit, the codec unit to decompress one or more portions of compressed data from the read-only surface, wherein the read-only surface includes vertex data, texture data, or other constant data to be read by the shader engine.

* * * * *